United States Patent
Schaefer et al.

(10) Patent No.: US 11,624,395 B2
(45) Date of Patent: Apr. 11, 2023

(54) CHANNEL STRUT FASTENERS

(71) Applicant: D Three Enterprises LLC, Fort Lupton, CO (US)

(72) Inventors: Richard F. Schaefer, Fort Lupton, CO (US); David Kreutzman, Yuma, AZ (US)

(73) Assignee: D Three Enterprises, LLC, Fort Lupton, CO (US)

( * ) Notice: Subject to any disclaimer, the term of this patent is extended or adjusted under 35 U.S.C. 154(b) by 0 days.

(21) Appl. No.: 17/167,660

(22) Filed: Feb. 4, 2021

(65) Prior Publication Data

US 2022/0128085 A1 Apr. 28, 2022

Related U.S. Application Data

(63) Continuation-in-part of application No. 17/077,380, filed on Oct. 22, 2020.

(51) Int. Cl.
*F16B 37/04* (2006.01)

(52) U.S. Cl.
CPC .................................. *F16B 37/045* (2013.01)

(58) Field of Classification Search
CPC .... F16B 2200/40; F16B 37/045; F16B 7/187; F16B 37/046
See application file for complete search history.

(56) References Cited

U.S. PATENT DOCUMENTS

| | | | | |
|---|---|---|---|---|
| 2,944,642 A | * | 7/1960 | Evans | F16B 37/045 411/959 |
| 3,483,910 A | * | 12/1969 | Van Huffel | F16B 37/046 411/84 |
| 4,285,379 A | * | 8/1981 | Kowalski | F16B 37/046 411/85 |
| 2002/0071735 A1 | * | 6/2002 | Dinh | F16B 37/046 411/85 |
| 2010/0102011 A1 | * | 4/2010 | Blum | F16B 37/045 211/8 |
| 2012/0110788 A1 | * | 5/2012 | Chen | E04B 2/821 29/428 |
| 2016/0363153 A1 | * | 12/2016 | Lakoduk | F16B 37/044 |
| 2020/0103123 A1 | * | 4/2020 | Prate | F24D 3/146 |
| 2020/0256363 A1 | * | 8/2020 | Juzak | F16B 5/0621 |
| 2020/0355214 A1 | * | 11/2020 | Schlenker | F16B 37/044 |
| 2021/0048058 A1 | * | 2/2021 | Walker | B64C 3/26 |
| 2021/0396263 A1 | * | 12/2021 | Nijdam | F16B 39/282 |

* cited by examiner

*Primary Examiner* — Gisele D Ford
(74) *Attorney, Agent, or Firm* — Russell Manning; FisherBroyles, LLP

(57) ABSTRACT

Provided herein is a fastener that may be used to secure objects to a channel strut or attach a channel strut to a structure. In an arrangement, the fastener is a fastener block configured for disposition within the interior of a channel strut. The fastener block has a body that includes at least one aperture that extends through the fastener block between upper and lower surfaces. A fastener receptacle is formed around the aperture. A standard nut or bolt may be inserted into the fastener receptacle.

17 Claims, 23 Drawing Sheets

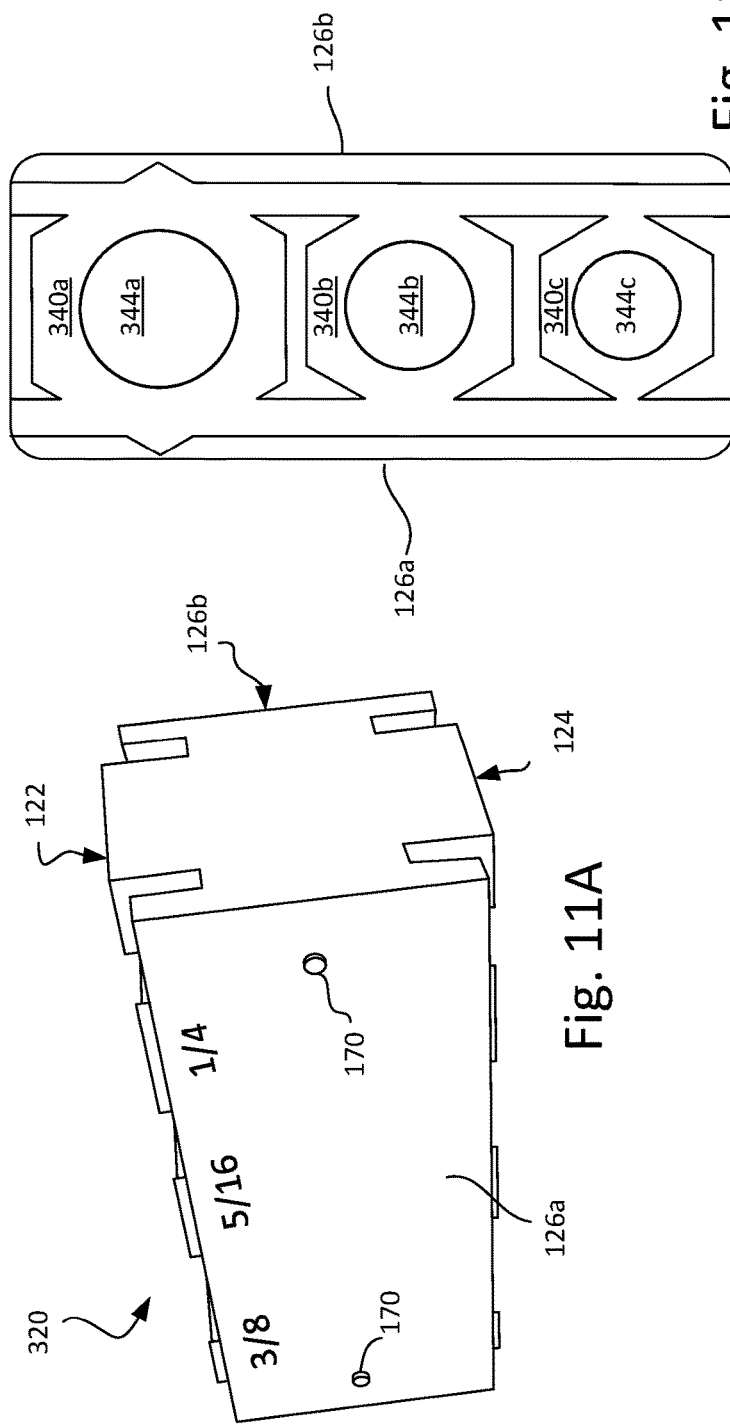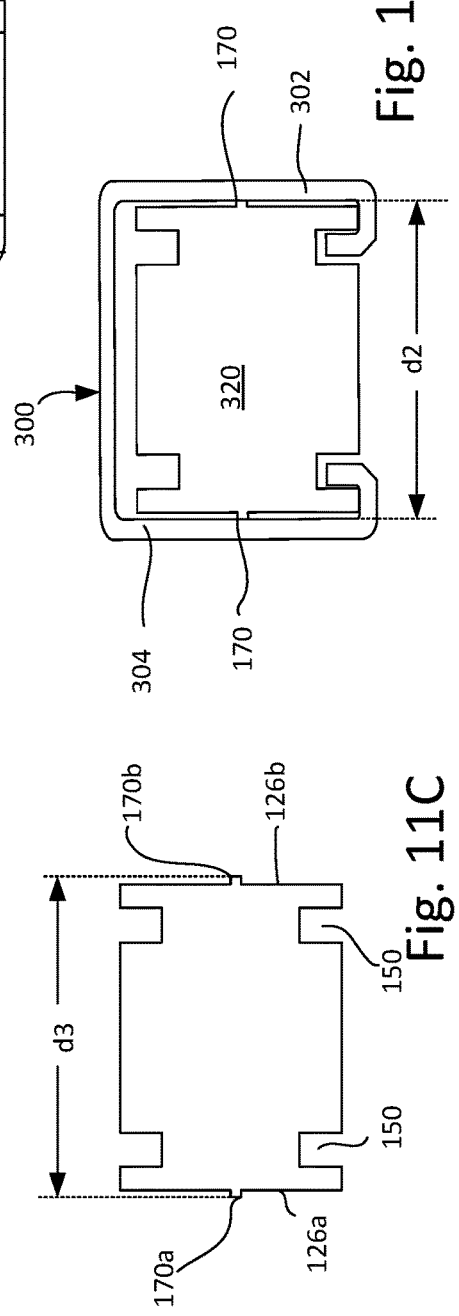

CHANNEL STRUT FASTENERS

CROSS REFERENCE

The present application is a continuation-in-part of U.S. patent application Ser. No. 17/077,380 having a filing date of Oct. 22, 2020, the entire contents of which is incorporated herein by reference.

FIELD

The present disclosure generally relates to fasteners for channel strut framing. More specifically, a fastener arrangement is provided that allows for using standard SAE and/or metric hardware (e.g., nuts and bolts) to fastens objects to channel strut framing.

BACKGROUND

One type of channel framing is called strut channel or channel strut (used herein interchangeably), which is commonly used in the construction and electrical industries for structural support, often for supporting wiring, plumbing, or mechanical components such as air conditioning or ventilation systems. Strut channel may be utilized in numerous other industries and applications. Strut channel is usually formed from metal sheet, folded over to define an open channel with inward-curving lips to provide additional stiffness and as a location to mount interconnecting components. A fastener nut may be inserted into the interior of the channel (e.g., behind the inward curving lips) for use in securing a part to the open channel side of the strut channel. The side of the strut channel opposite the open channel and/or the sidewalls of the channel may further include repeating apertures or slots to facilitate interconnection or fastening the strut to underlying building structures.

Strut channel is standardized allowing struts and components from different manufacturers to be compatible. Basic strut channel comes in the open box section, 1⅝ by 1⅝ inch square cross section. A half-height (1⅝ inch wide, 13/16 inch tall) cross section version is also available. A deep channel 2 7/16 inches tall and 1⅝ inch wide is also manufactured. Additionally, a half-width (13/16 inch wide) version is also available.

In any arrangement, the inwards-facing lips on the open side of strut channel are routinely used to mount specialized nuts, braces, connecting angles, and other types of interconnection mechanisms or devices to join lengths of strut channel together or connect pipes, wire, other structures, threaded rod, bolts, or walls into a strut channel structural system.

SUMMARY

Aspects of the presented disclosure are based on the realization that existing strut channel attachments methods typically require the use of specialized fasteners. That is, most strut channel attachment systems require the use of specialized fastener nuts or bolts that engage within the interior of the strut channel. Difficulties arise when a user wants to use standard fastening hardware (e.g., nuts and bolts of various standard sizes both SAE and metric). Previous attachment methods and systems require specific hardware (e.g., channel nut, channel bolt). If a user wants to utilize a different sized fastener (e.g., diameter), the use must have the specialized hardware of the desired size and thread type. This creates a cumbersome and costly requirement for a user who may need to vary a fastener size based on the specific usage, which can vary for each attachment encountered. Provided herein is a fastener that may be used to secure objects to a channel strut or attach a channel strut to a structure. In various arrangements, the fastener is configured to engage and hold a threaded fastener such as nut or a bolt. By way of example only, the fastener may engage standard hex head nuts or hex head bolts. Once engaged with the fastener, the nut or bolt is prevented from rotating. Accordingly, the fastener may then be positioned within a strut and a mating bolt or nut may be affixed to the nut or bolt engaged with the fastener.

In an arrangement, the fastener is a fastener block configured for disposition within the interior of a channel strut. At least one aperture extends through the fastener block (e.g., body) between an upper and a lower surface. A fastener receptacle is disposed around the aperture. In various arrangements, the fastener receptacle may be a protrusion that at least partially extends above the upper surface of the fastener block/body. In such an arrangement, the protrusion may have a recessed interior sized to receive a nut or a bolt head (e.g., hexagon recess). In another arrangement, the fastener receptacle may be formed as a recess below the upper surface of the block. A correspondingly shaped nut or bolt may be inserted into the fastener recess. Once disposed within the fastener receptacle and the fastener block is disposed within a strut channel, the nut or bolt is secured relative to the strut channel and prevented from rotating. A user may then engage the nut or bolt with a mating fastener. The fastener block may optionally include at least one pair of spaced apart and parallel recesses (e.g., recessed channels) disposed on opposing sides of the aperture. The recessed channels may be to engage the inward lips of the strut channel. Once the pair to recessed channels engage the strut channel lips, the fastener block is prevented from rotating.

In an arrangement, the fastener block includes first and second fastener receptacles on opposing surfaces (e.g., upper and lower surfaces of the fastener block). In this arrangement, the fastener block may include two pairs of parallel recessed channels, one pair on its upper surface and one pair on its lower surface. In such an arrangement, the fastener receptacles on the upper and lower surfaces may have different cross-dimensions permitting the fastener block to engage differently sized nuts or bolts.

In another arrangement, the fastener block may include two or more concentric or nested fastener receptacles. In one arrangement, a second fastener receptacle (e.g., recess) may be formed in the bottom surface of a first fastener receptacle. In such an arrangement, the second receptacle may be smaller than the first receptacle. Accordingly, the second receptacle may engage nut or bolts of a different size (i.e., smaller) that the first receptacle. In a further arrangement, the fastener block may include a third receptacle (e.g., recess) formed in the bottom surface of the second receptacle.

In a further arrangement, the fastener block may include multiple apertures. In such an arrangement one or both sides of the multiple apertures may include fastener receptacles, each of which may have a different cross-dimension. In such an arrangement, the fastener block may be configured for use with multiple different sized fasteners including, for example, standard and metric nuts and bolts.

In an arrangement, the fastener block may be non-conductive (e.g., polymeric). Such a non-conductive fastener block may prevent galvanic corrosion (e.g., dielectric contact) between a metal channel strut and a metal fastener. Additionally, a polymeric fastener block (e.g., plastic) may be light weight.

DESCRIPTION OF THE FIGURES

FIGS. 11A-11D illustrates perspective, top, end and engaged views of another embodiment of a fastener block.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 1A:
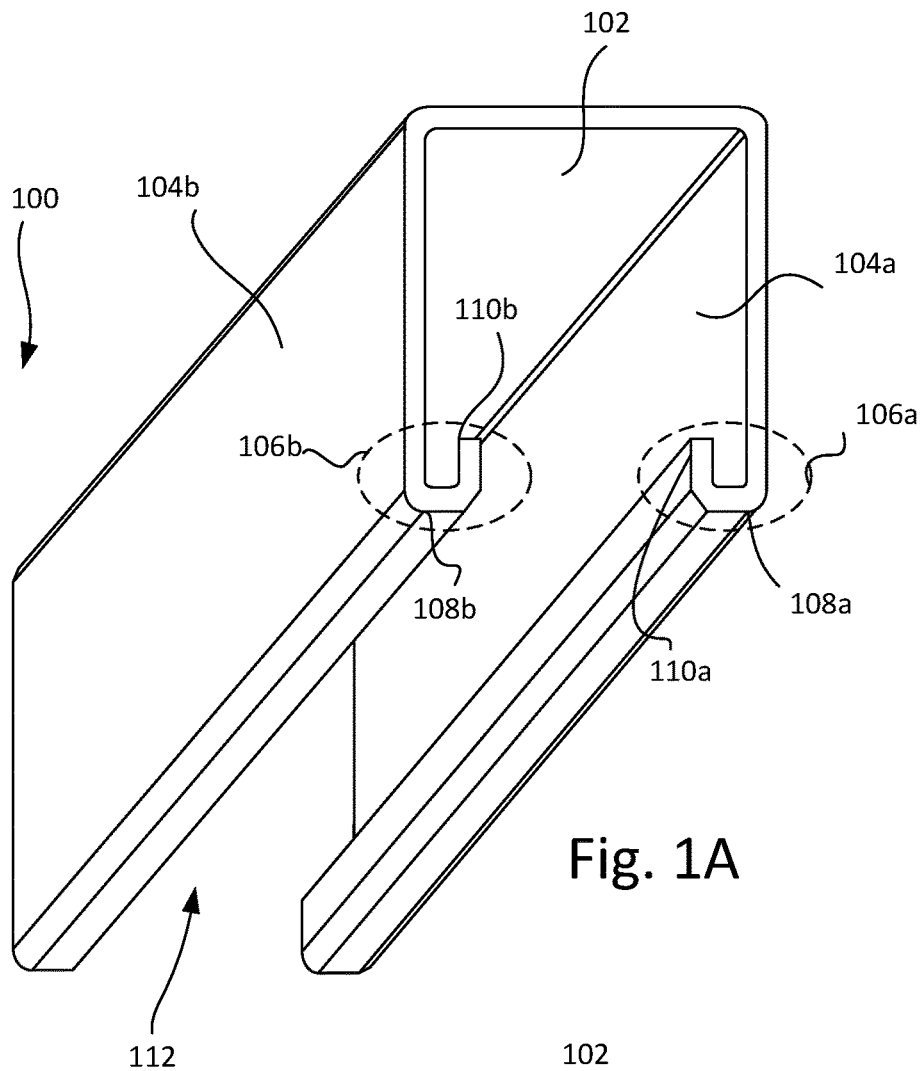
FIG. 1A illustrates an exemplary strut channel.
Figure 1B:
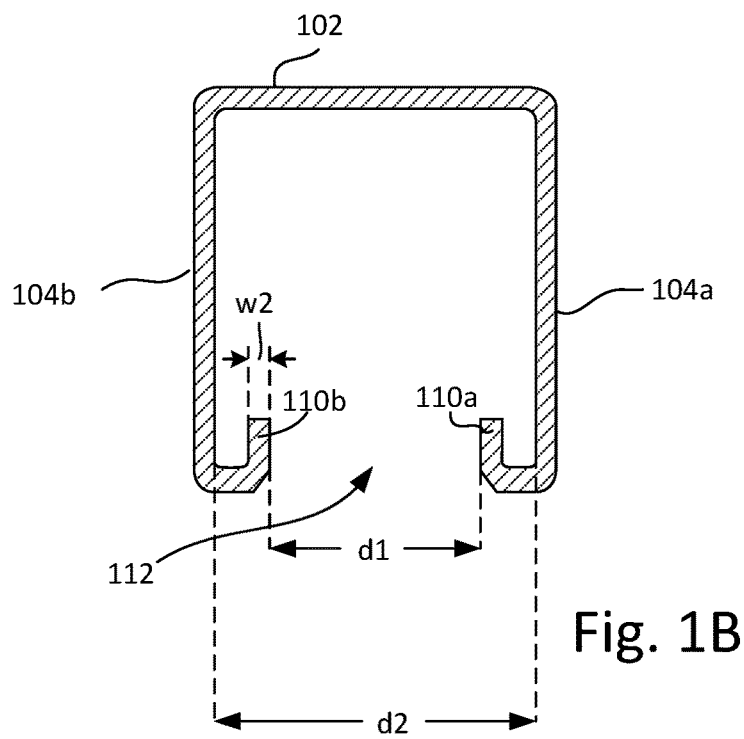
FIG. 1B illustrates a cross-sectional view of FIG. 1A.

FIG. 1A is a perspective view of a section of a channel strut 100 and FIG. 1B is a cross-sectional view of the strut 100. As shown, the strut 100 has three sidewall surfaces and a generally open side surface. More specifically, the strut 100 may include a closed or bottom-end 102 (which may have various apertures formed therein), a first side-wall surface 104a and a second sidewall surface 104b (collectively, sidewalls 104). Disposed on the free ends of the sidewalls 104 are a first flange 106a and a second flange 106b, respectively, (collectively, flanges 106). The first flange 106a, may include a first inwardly projecting portion 108a and a first upwardly projecting portion 110a (e.g., lip). Likewise, the second flange 106b may include a second inwardly projecting portion 108b and a second upwardly projecting portion 110b (e.g., lip). Collectively, the inward and upward projections of the flanges 106 define inwardly curving lips on the open side of the channel strut. Such flanges/lips provide additional stiffness to the strut channel as well as a location to mount interconnecting components. As shown in FIG. 1B, the side of the strut 100 opposite the end-surface 102 has an opening 112 between the facing or inside surfaces of the flanges 106. The opening 112 has a width of d1 between the first upwardly projection portion 108a and the second upwardly projecting portion 108b. Further, the channel strut 100 has a channel width of d2 from the inner surface of the first sidewall 104a to the inner surface of the second sidewall 104b.

Figure 2A:
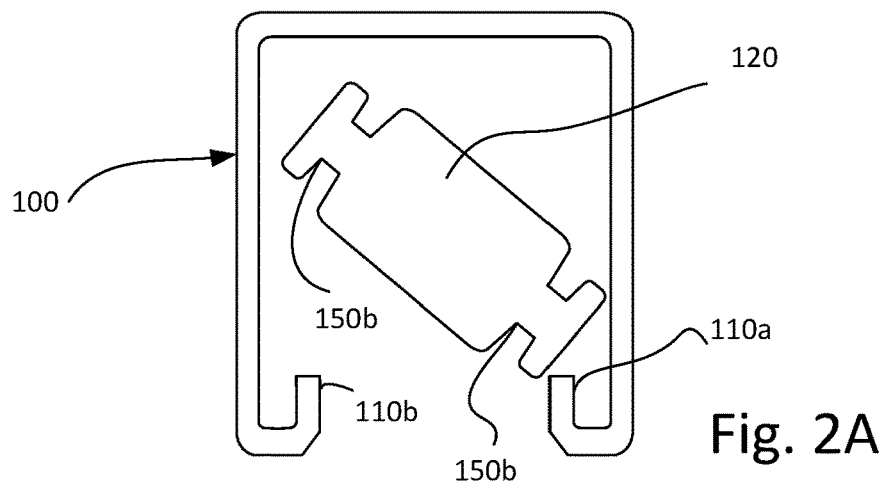
FIGS. 2A, 2B and 2C illustrate use of a fastener block to attach an object to a strut channel.

As illustrated in FIG. 2A, a fastener block 120, in accordance with some aspects of the present disclosure, may be disposed through the opening 112 in the strut channel 100. The fastener block 120 may then be positioned (e.g., rotated) to extend across the top surfaces of the upward projections 110a and 110b and between the inside surfaces of the sidewalls 104. Once the fastener block 120 is positioned across the opening 112, a fastener such as a bolt 162 may engage a nut (not shown) engaged with the fastener block 120 to secure and object 164 against the surface of the channel strut 100. The fastener block may be utilized in various different ways. No limitation should be inferred.

As noted above, prior strut channel fasteners are formed as specialized fastener nuts or specialized fastener bolts configured to engage with the strut channel. Such prior fasteners have a predetermined nut or bolt diameter. In these arrangements, a specialized fastener nut that engages with the strut may receive a standard bolt and a specialized fastener bolt that engages with the strut may engage a standard nut. However, such prior fastening systems cannot be utilized with both standard nuts and bolts (e.g., SAE and metric). If a user wants to utilize different sized fastener hardware, the user needs to have a different sized specialized fastener. That is, such prior art specialized fasteners cannot accommodate differently sized fastener hardware (e.g., nuts, bolts, thread types etc.).

Figure 3A:
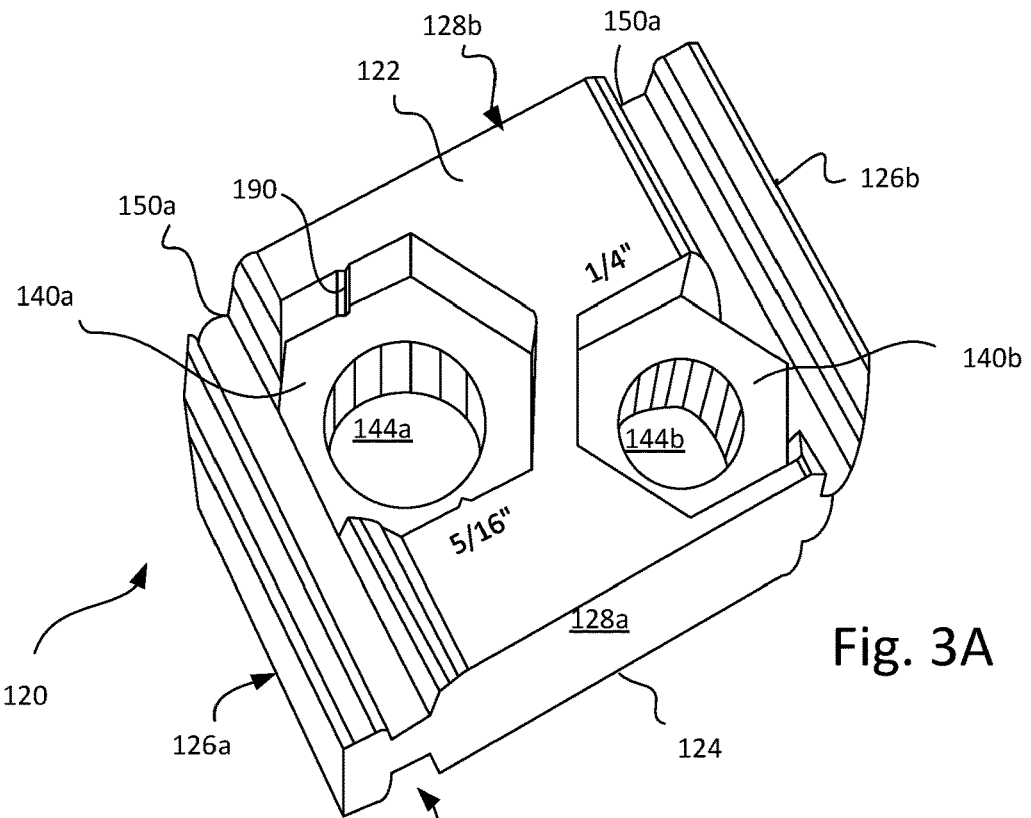
FIGS. 3A and 3B illustrate top and bottom perspective views of one embodiment of a fastener block.
Figure 3B:
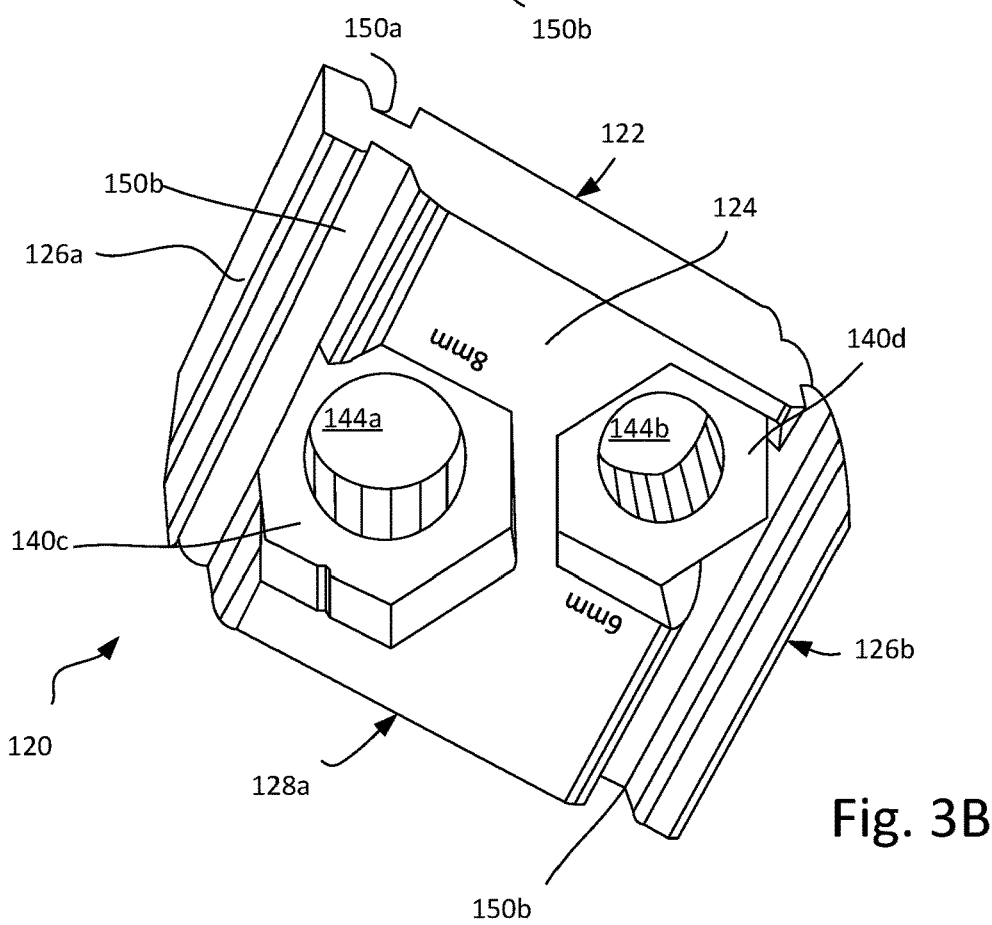
Figure 4A:
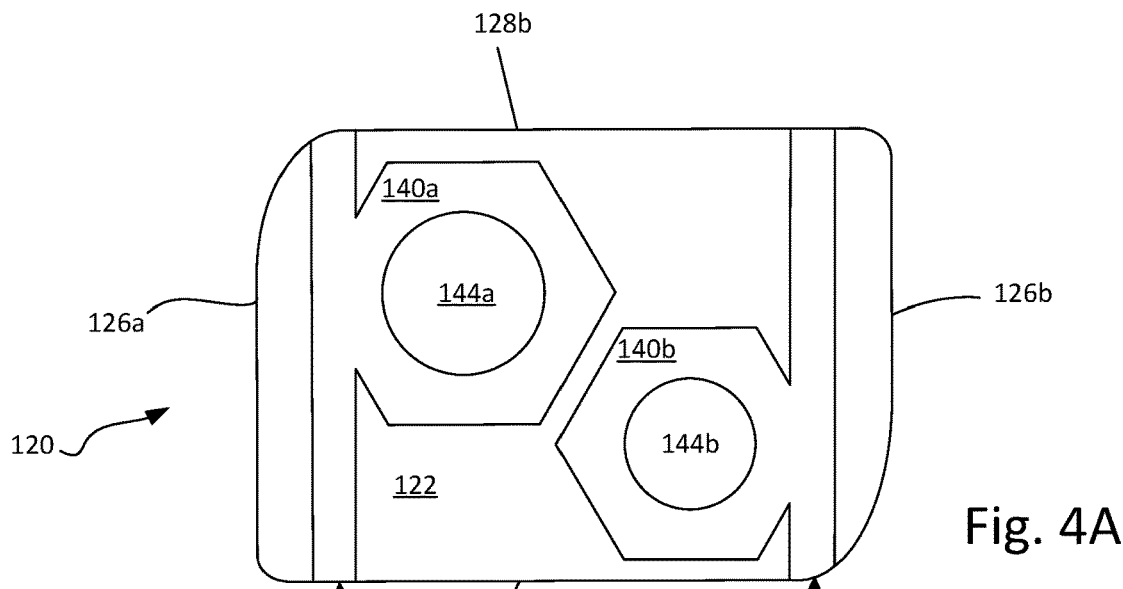
FIGS. 4A, 4B and 4C illustrates top, side and bottom views of the fastener block of FIGS. 3A and 3B.
Figure 4B:
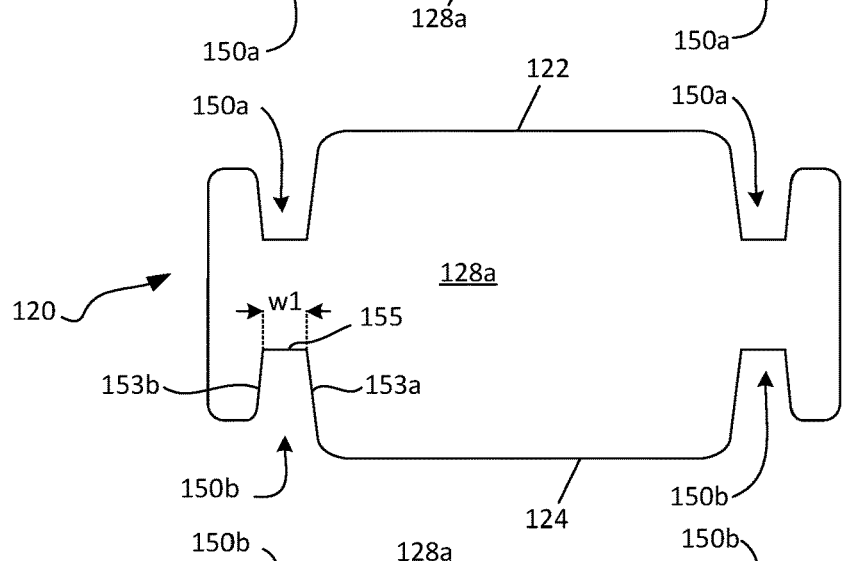
Figure 4C:
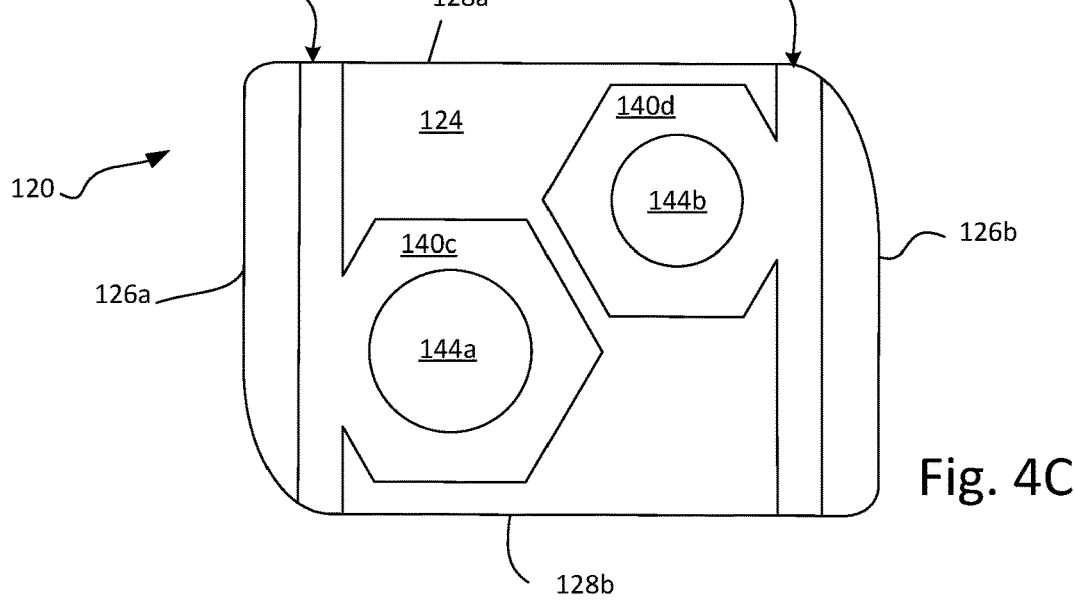

FIGS. 3A and 3B illustrate top and bottom perspective views of a fastener block 120 in accordance with some aspects of the present disclosure. FIGS. 4A-4C illustrate top, side and bottom views of the fastener block 120. In the illustrated embodiment, the fastener block 120 is roughly defined as a rectangular prismatic body having an upper surface 122, a lower surface 124, and four side surfaces extending between the upper surface 122 and the lower surface 124. Specifically, the body of the fastener block 120 includes opposing side surfaces 126a, 126b, a front side surface 128a and a rear side surface 128b. In the embodiment illustrated in FIG. 3A-4C, the fastener block 120 incudes a plurality of fastener receptacles, which in the illustrated embodiment are recesses 140a-d (hereafter 140 unless specifically referenced) formed into its upper and lower surfaces. The fastener recesses 140 each extend partway into the body of the fastener block 120.

Figure 2B:
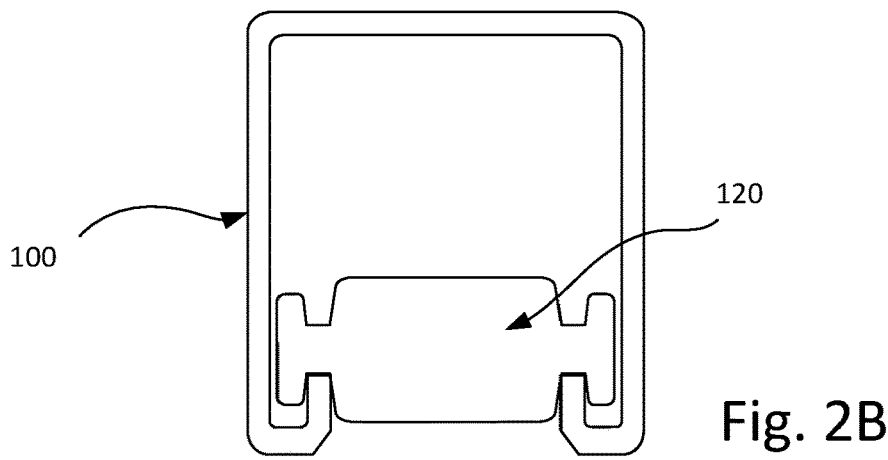
Figure 2C:
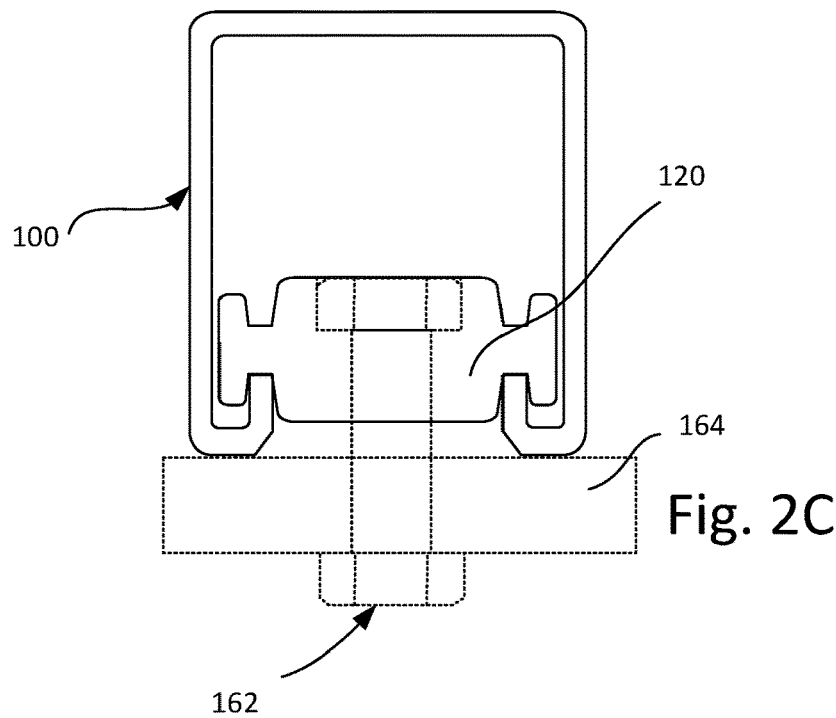

Upper and lower pairs of channels 150a, 150b are formed into the upper and lower surfaces of the fastener block 120 and extend between the front and rear side surfaces 128 of the fastener block 120. The upper or lower pairs of channels are configured to engage with the first upwardly projecting portion 110a (e.g., first lip) and the second upwardly projecting portion 110b (e.g., second lip) of the channel strut 100 when the fastener block 120 is disposed therein. This is best illustrated in FIGS. 2A and 2C, which show the lower pair of channels 150b engaging the upwardly projection portion of the channel flanges/lips 110. As will be appreciated, the fastener block is resistant to rotating/turning when the channels are fully engaged with the channel flanges/lips.

Referring to FIG. 3A, the illustrated embodiment of the fastener block 120 includes two fastener receptacles or recesses 140a and 140b, which are recessed into the upper surface 122. Each fastener recess 140a and 140b surrounds an aperture 144a and 144b, respectively, which passes through the body of the fastener block 120. In the illustrated embodiment, these recesses 140 are hexagonal-shaped recesses, which are sized to receive correspondingly sized hexagonal fasteners. That is, each recess may be sized to receive a hexagonal nut or a hexagonal head of a bolt. In this specific embodiment, the first recess 140a is sized to receive a 5/16 inch hexagonal nut or bolt while the second recess 140b is sized to receive a ¼ inch hexagonal nut or bolt. The sidewalls of the recess may be substantially parallel to a centerline axis of the aperture. Alternatively, the sidewalls my taper such that the recess is slightly narrower at the bottom edge of the recess comparted to the top edge of the recess. Such tapering may provide a compression fit with an inserted fastener (e.g., nut or bolt) to hold the fastener within the recess. In various embodiments, the block may include surface indicia showing the size of the fastener recesses. As further illustrated in FIG. 3B, the fastener block 120 includes two additional fastener recesses 140c and 140d that are recessed into its lower surface 124. Each of the lower fastener recesses 140c and 140d are likewise disposed around one of the apertures 144a and 144b. In this regard, first and second opposing fastener receptacles may be disposed around both an upper and lower end of each aperture. In the illustrated embodiment, the lower fastener receptacles may have dimensions that are different than the dimensions of the upper fastener receptacles, which may themselves be different. By way of example, the third recess 140c is sized to receive an 8 mm hexagonal nut or bolt while the fourth recess 140c is sized to receive a 6 mm hexagonal nut or bolt. In this regard, a single fastener block 120 may be utilized with a variety of differently sized hardware.

Figure 5A:
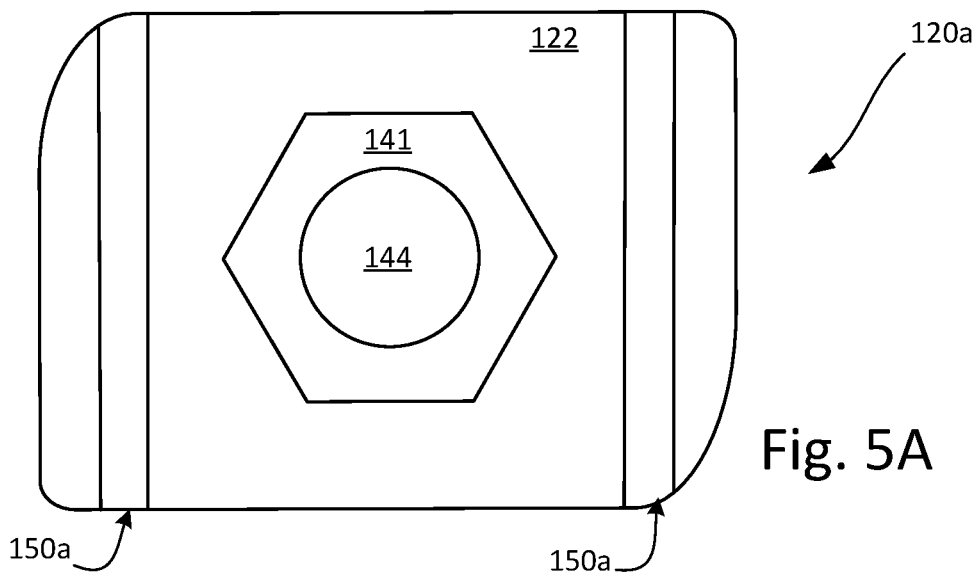
FIGS. 5A, 5B and 5C illustrates top, side and bottom views of another embodiment of a fastener block.
Figure 5B:
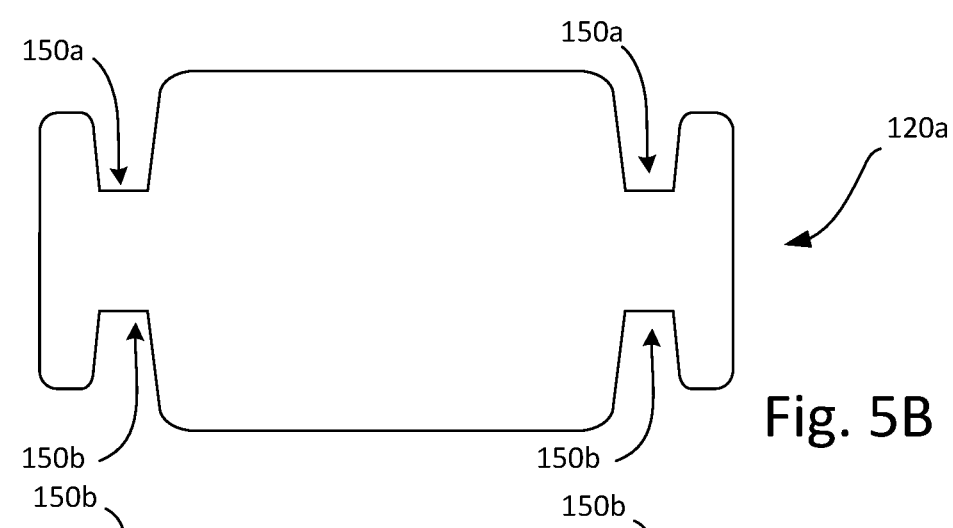
Figure 5C:
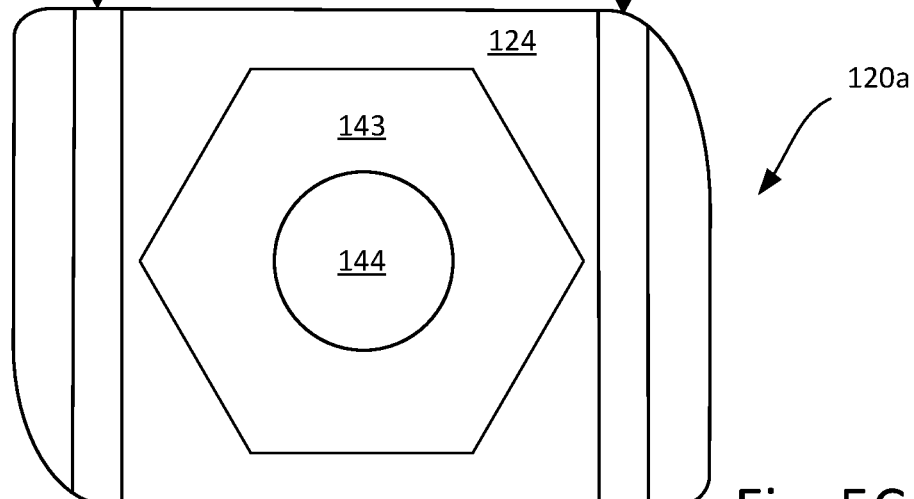

FIGS. 5A-5C illustrate another embodiment of a fastener block 120a. This embodiment of the fastener block 120a shares many of the same attributes as the fastener block 120 described in relation to FIGS. 3A-4C and like reference numeral are utilized to refer to like elements. As shown, this embodiment the fastener block 120a includes a single aperture 144 that extends through the block between its upper surface 122 and its lower surface 124. Likewise, the fastener block 120a includes a single upper hexagonal fastener receptacle 141 that is recessed into the upper surface 122 and a single lower hexagonal fastener receptacle that is recessed into the lower surface 124. In such an embodiment, the fastener block may allow use with two differently sized standard hexagonal bolts and/or nuts.

Figure 6A:
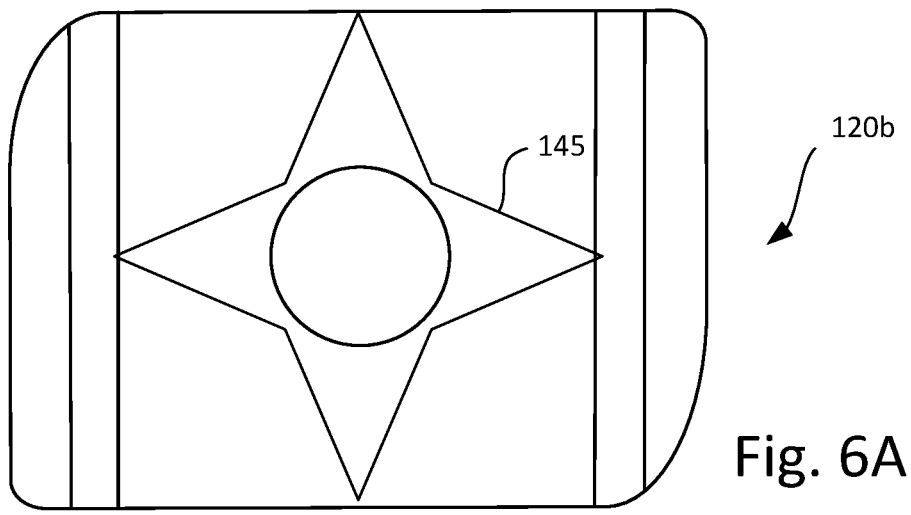
FIGS. 6A, 6B and 6C illustrates top views of three additional embodiments of a fastener block.
Figure 6B:
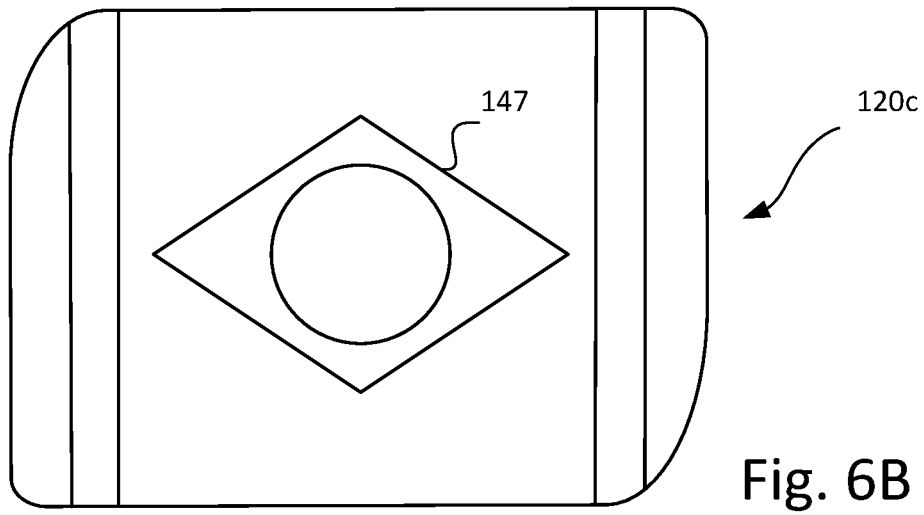
Figure 6C:
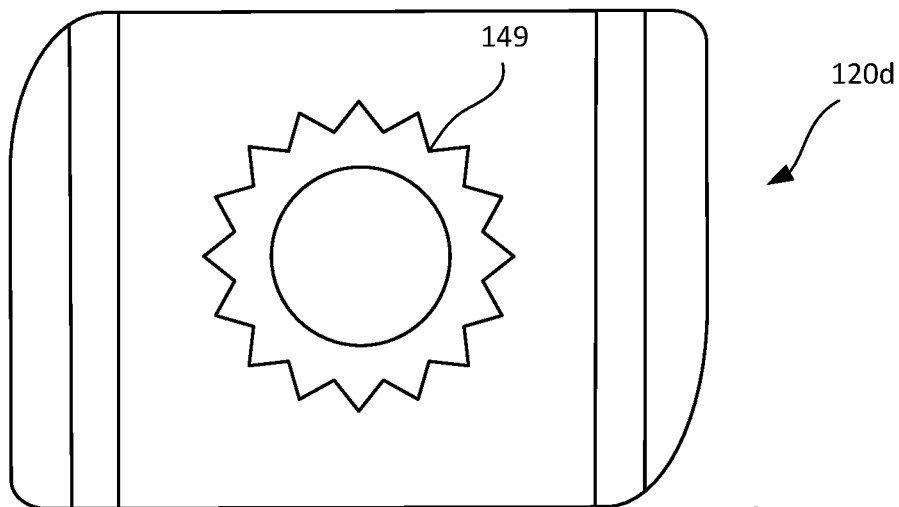

Though previously discussed as utilizing hexagonal fastener recesses, it will be appreciated that the fastener block of the present disclosure is not limited any specific receptacle configuration. That is, the fastener receptacle(s) may have any appropriate shape to match any corresponding fastener. FIGS. 6A-6C illustrates three nonlimiting embodiments of fastener blocks 120b, 120c and 120d, respectively, which utilize various differently shaped fastener recesses in their top and/or bottom surfaces. By way of example, the fastener block 120b of FIG. 6A utilizes a four-pointed star fastener recess 145, the fastener block 120c of FIG. 6B utilizes a diamond-shaped fastener recess and the fastener block 120d of FIG. 6C utilizes a multi-pointed star-shaped fastener recess 149. Other variations are possible. Of further note, the shape of the fastener receptacles may vary between the top surface and the bottom surface. What is important is that the fastener receptacle be configured to at least partially engage a fastener (e.g., nut or bolt head) and prevent the fastener from turning while being engaged by a matching fastener.

Figure 7B:
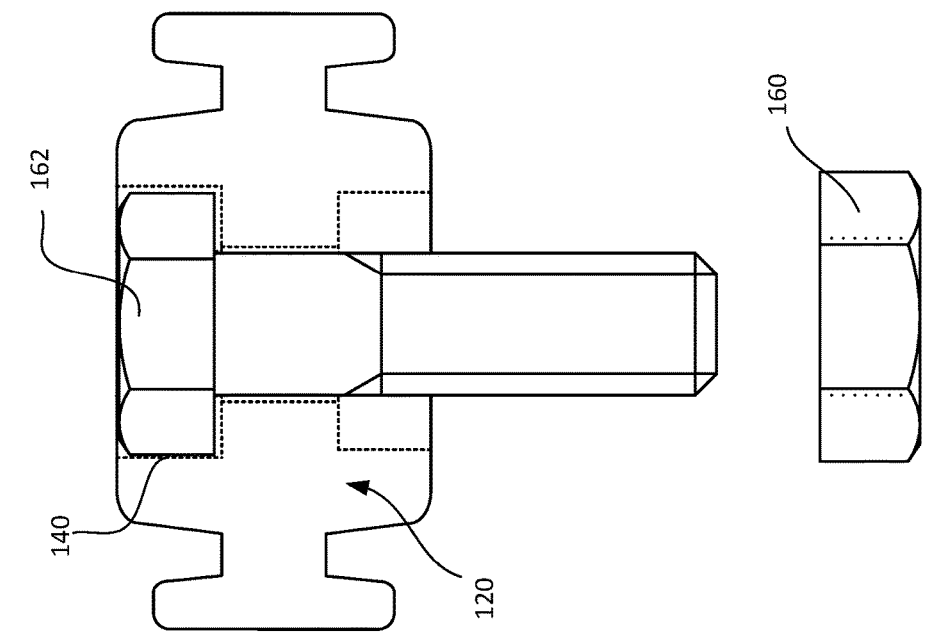
FIGS. 7A and 7B illustrate use of a fastener block to support a nut and a bolt, respectively.
Figure 7A:
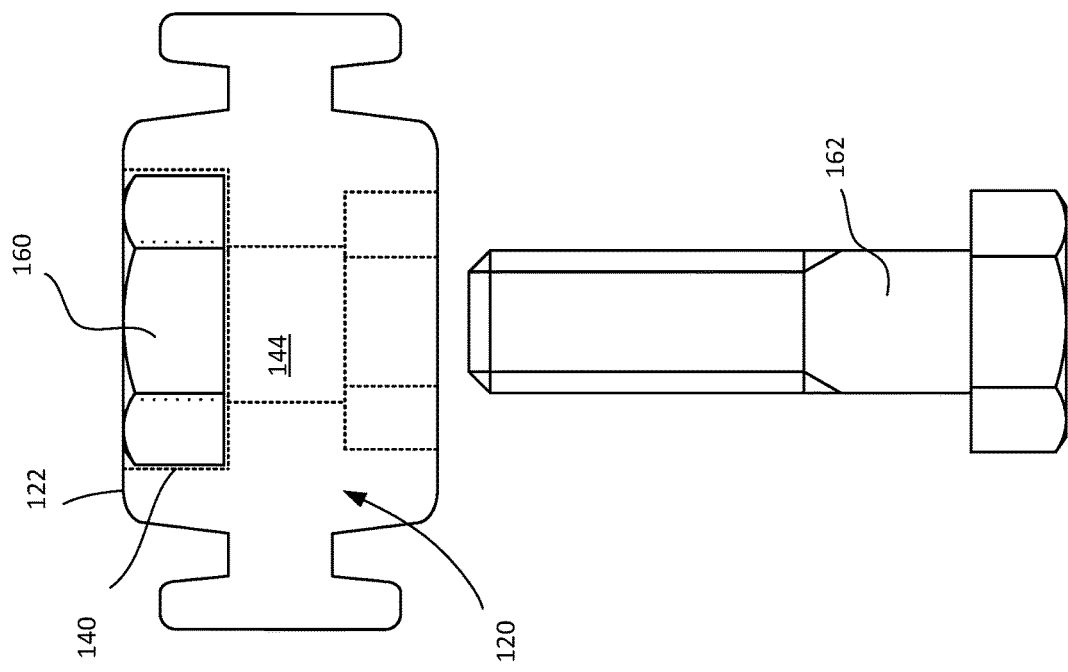

The disclosed fastener blocks may be utilized to position either a standard nut or a standard bolt within a strut channel to allow for attachment thereto. As illustrated in FIG. 7A, the fastener block 120 is shown with a standard hexagonal nut 160 disposed within the fastener recess 140 within its top surface. In the illustrated embodiment, the depth of the fastener recess 140 is equal to the thickness of the nut 160. However, this is not a requirement. Once the hexagonal nut 160 is disposed within the fastener recess 140, and the fastener block 120 engages a strut channel (not shown), a bolt may extend through the fastener block aperture 144 to engage the nut 160. FIG. 7B illustrates a configuration where the fastener block 120 receives the bolt 162, which extends through the central aperture of the fastener block until the hexagonal head of the bolt is received within the fastener recess 140. Once the fastener block is engaged with a strut channel (not shown), the hexagonal nut may engage the threads on the distal end of the supported bolt 162.

Figure 8:
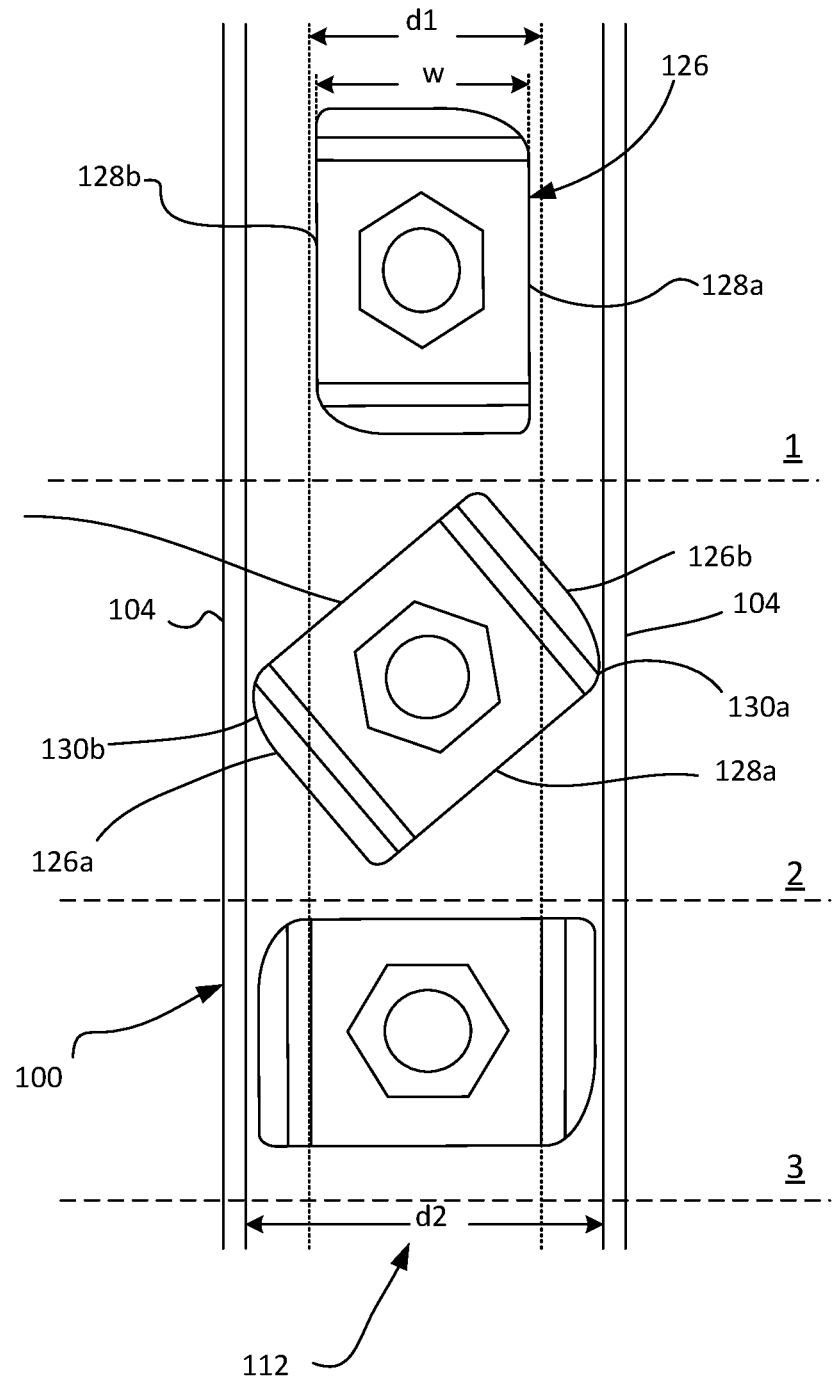
FIG. 8 illustrates the rotation of a fastener block about a first axis within a channel strut.

As mentioned above with respect to FIGS. 2A-2C, a fastener block 120 may be inserted into the open channel of the strut 100 and rotated to secure the fastener within the strut 100. FIG. 8 illustrates a fastener block disposed between the sidewalls 104 of a strut channel 100. For clarity, the flanges/lips are removed though the inside edges of the flanges are shown in phantom to illustrate the width d1 of the channel opening 112. In an embodiment, fastener 100 has a width 'w' that is narrow enough to be inserted into the channel opening 112. For example, as illustrated in the top position (e.g., position 1) in FIG. 8, the fastener width w is less than opening width d1 of the strut channel 112. In this example, width w extends between the front and rear side surfaces 128a and 128b. Once the fastener block 120 is inserted into the strut 100, the fastener block 120 may be rotated as shown in the middle position (e.g., position 2) of FIG. 8. In the illustrated embodiment, the fastener block 120 includes opposite rounded side-surface corners 130a and 130b. A first rounded corner 130a extends between the front side surface 128a and the second opposing side surface 126b. The second rounded corner 130b extends between the first opposing side surface 126a and the rearward surface 128b. The rounded corners 130a, 130b allow the fastener block 120 to be rotated from the middle position to the bottom position (e.g., position 3) in FIG. 8. That is, if a distance measured from the first rounded corner 130a to the second rounded corner 130b is less than the width d2 of the strut channel, the fastener block 130 may rotate about an axis normal to its top and/or bottom surfaces while disposed within the channel. That is, the rounded corners and/or opposing corners having a maximum length therebetween that is less than the length of the channel width allow turning the fastener block.

Figure 9C:
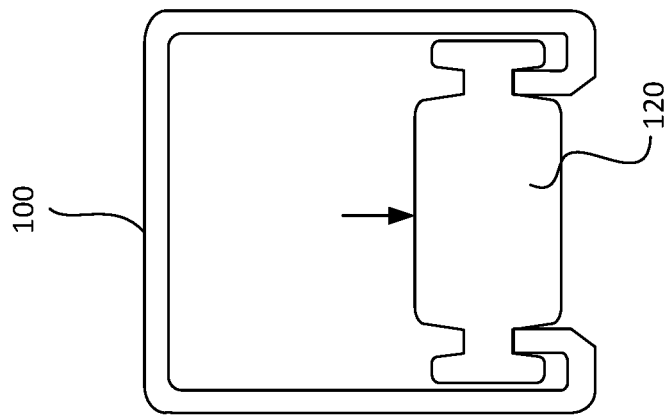
FIGS. 9A, 9B and 9C illustrates the rotation of a fastener block about its long axis within a channel strut.
Figure 9B:
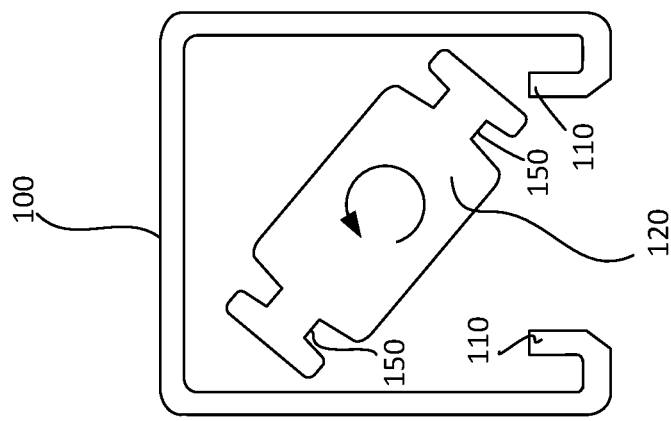
Figure 9A:
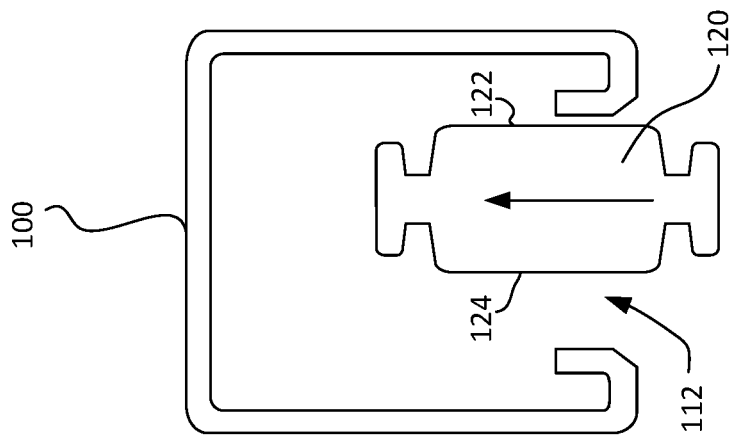

The ability to rotate the fastener block about an axis normal to its upper surface limits an overall length of a fastener block and, therefore, the number of fastener recesses that the fastener block may contain. However, it will be appreciated that the fastener block may be rotated about an axis that is perpendicular to an axis normal to the top and/or bottom surface of the fastener block. This is illustrated in FIGS. 9A-9C. As shown, the fastener block 120 may be inserted into the opening 112 of the strut channel 100 as long as the thickness (e.g., between the top and bottom surfaces 122, 124) of the fastener block 120 is less than the width of the opening. See FIG. 9A. Once within the strut channel, the fastener block may be rotated around its long axis (i.e., normal to the paper; see FIG. 9B) to align the channels 150 with the lips 110 of the channel opening. The fastener block may then be pulled into engagement with the lips 110. See FIG. 9C.

Figure 10:
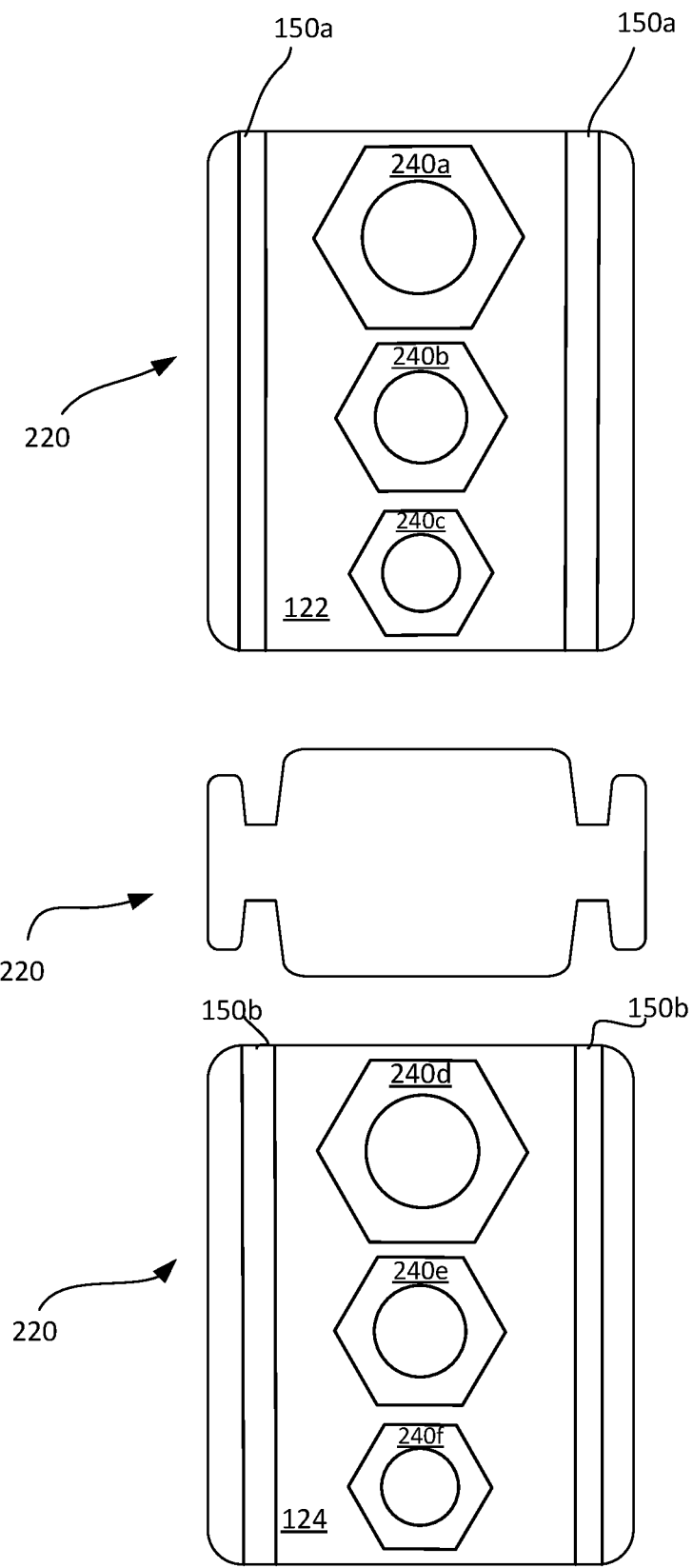
FIG. 10 illustrates top, side and bottom views of another embodiment of a fastener block.

FIG. 10 illustrates top, side and bottom views of one embodiment of a fastener block 220 having a length that prevents rotation within a channel strut about an axis normal to its top surface. This embodiment of the fastener block 220 shares many of the same attributes as the fastener block 120 described in relation to FIGS. 3A-4C and like reference numeral are utilized to refer to like elements. This embodiment of the fastener block includes a set of three fastener recesses 240a-240c on its top surface 122 and a set of three fastener recesses 240d-240f on its bottom surface 124. The six total fastener recesses 240a-f are disposed on opposing sides of three apertures 244a-c that pass through the body of the fastener block between its upper and lower surfaces. In this embodiment, each of the fastener recesses may be aligned with center of the fastener block (e.g., midway between the channels 150) such that an object attached to a channel strut may be aligned with a center of the channel opening. In addition, the six fastener recesses 240a-f may each be different sized allowing a single fastener block to be utilized with standard nuts and bolts having at least six different cross-dimensions (e.g., diameters). Other configurations are possible.

FIGS. 11A-11D illustrate yet another version of a fastener block 320. This embodiment of the fastener block 320 is configured for receipt within a half channel 300 and may require insertion through an end surface of the channel. The fastener block includes six differently sized fastener recesses 340a-f (only three shown) disposed within the upper and lower surfaces 122, 124 of the fastener block 320. As with the previous fastener blocks, the upper and lower surfaces include channels 150 that are configured to engage the lips of a strut channel.

One difficulty in positioning a fastener block within a strut channel is that the fastener block may move along the channel. This is especially problematic when the strut is vertically positioned. That is, a fastener block disposed within the channel tends to fall to the bottom of the strut. A user is required to hold the fastener block in place. To facilitate maintaining the position of a fastener block in a desired position once inserted into a strut channel, the embodiment illustrated in FIGS. 11A-11D includes a number of small protrusions 170 formed on the fastener block's side surfaces 126a, 126b, which are positioned between opposing sidewalls 302 and 304 of the strut channel. As defined above, the channel width of the strut channel between the inside surfaces of the opposing sidewalls may be defined as having a distance or width of 'd2'. This width d2 is wider than a distance between the opposing side surfaces 126a and 126b of the fastener block to allow the fastener block to be positioned therebetween. However, a width or distance 'd3' between the outside surfaces of opposing protrusions 170a, 170b (see FIG. 11C) is greater than the channel width d2. In this regard, the opposing protrusions engage the opposing inside surfaces of the channel 300 when the fastener block is disposed therein. See FIG. 11D. This engagement provides sufficient friction to hold the fastener block 320 in a desired location within the strut channel 300. Though discussed in relation to the embodiment of FIGS. 11A-11D, it will be appreciated that such protrusions may be incorporated with any of the fastener blocks disclosed herein.

The protrusions 170 are preferably formed of a malleable material such that they may deform to allow a fastener block to be positioned within a strut channel. In one embodiment, the protrusions are integrally formed with the fastener block. In such an arrangement, the fastener block and the protrusions may be formed in, without limitation, a 3-D printing process or a molding process (e.g., injection molding). In one embodiment, the fastener block and, if included, the protrusions are formed of a polymeric material. In another embodiment, the fastener block and, if included, the protrusions are formed from a metallic material. The fastener block may be made of any material that provides sufficient structural rigidity.

Additional features may be incorporated into the fastener blocks to maintain the fastener blocks in a desired location within a strut channel. Referring to FIG. 4B, it will be noted that each of the channels 150 formed within the body of the fastener block may have sidewalls 153a, 153b that are angled or tapered to a bottom surface 155. The width of the bottom surface 'w1' may be narrower that the width 'w2' of the upper end of upwardly projecting portion 110b or lip of the flanges. See FIG. 1B. (e.g., lip). More specifically, the sidewalls may taper from an opening that is wider than the upper end of the lip to the bottom surface of the channel. In this regard, the upper end of the projection portion/lip may wedge into the channel 150 when a user applies a compressive force between the fastener block and the strut channel.

Figure 12:
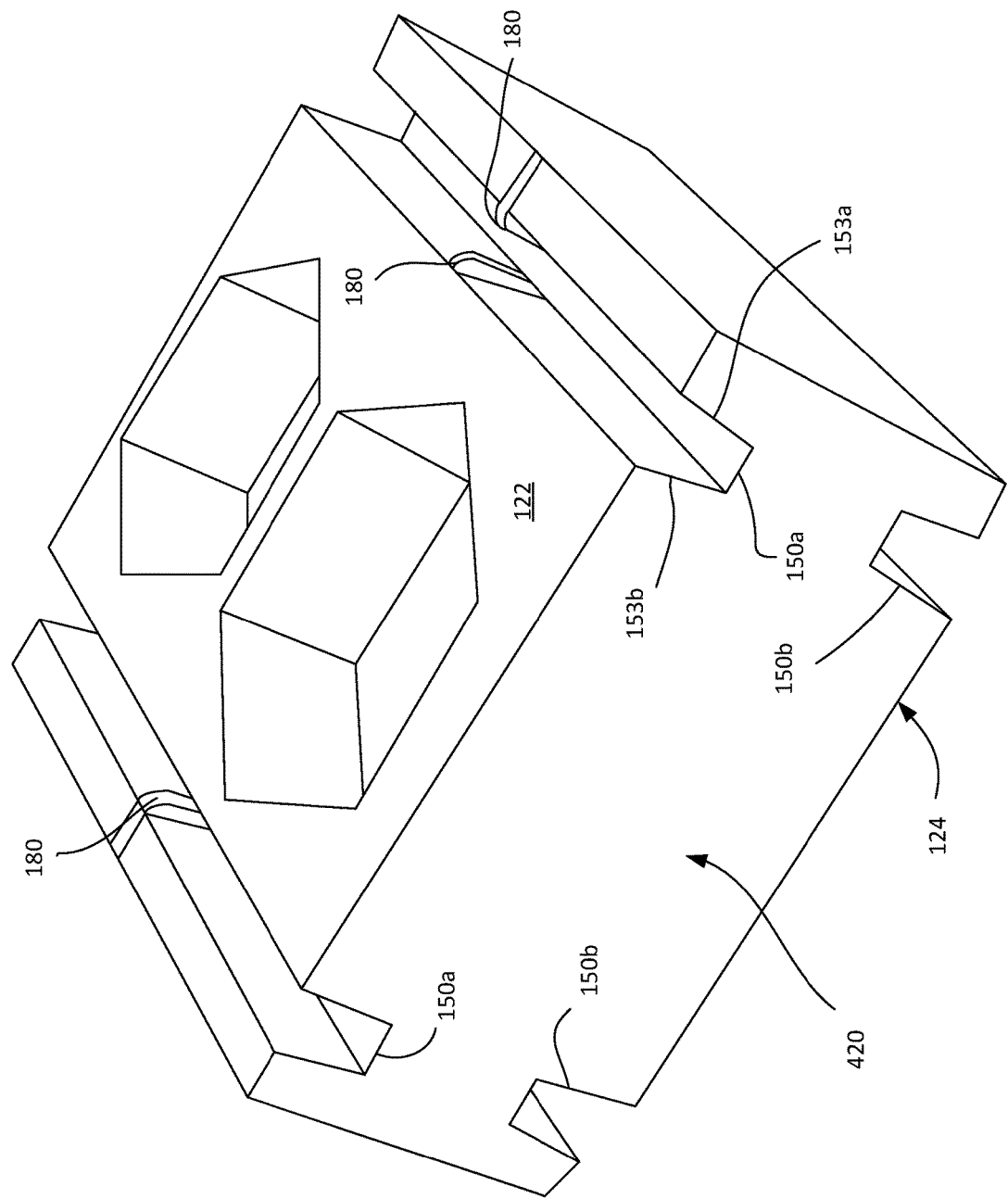
FIG. 12 illustrates a perspective view of another embodiment of a fastener block.

FIG. 12 illustrates a yet further embodiment of a fastener block 420. This fastener block again has a pair of upper channels 150a and fastener recesses formed into its upper surface. The fastener block may additionally include a pair of lower channels 150b and fastener recesses formed in its lower surface 124. To provide additional frictional contact between the fastener block and the lips of a strut channel, the channels 150 may include one or more deflectable protrusions or partial webs 180 that extend from the sidewall surfaces 153a, 153b of the channels 150. These partial webs may deflect and provide a frictional fit between the channel lips and the fastener block when the fastener block is compressed against the channel lips. As with the protrusions formed on the side surfaces of the fasteners, the partial webs are preferably formed of a malleable material such that they may deform to allow a fastener block to be fixedly positioned within a strut channel.

An additional problem that may be encountered when utilizing the fastener block is maintaining either a nut or bolt within a fastener recess during installation. That is, the nut or bolt may fall out of the fastener receptacle (e.g., recess). To provide a frictional fit between the fastener receptacle and an inserted fastener (e.g., nut or bolt head), the fastener recesses may include a protruding ridge that extends from a sidewall of the fastener recess into the open interior of the recess. This is illustrated in FIG. 3A which shows a ridge 190 disposed on the sidewall of the first fastener recess 140a. As shown, this embodiment of the ridge 190 is generally triangular-shaped and extends from the top surface 122 of the fastener block to the bottom of the first fastener recess. The ridge may provide a location within the fastener recess that has a cross-dimension that is slightly smaller than a corresponding cross-dimension of a fastener that will be disposed within the recess. Accordingly, if the ridge is formed of a malleable material, it may deform when a fastener is pressed into the recess and thereby provide a frictional fit with the inserted fastener. Such a ridge or other protrusion may be integrally formed with the fastener block.

Figure 13:
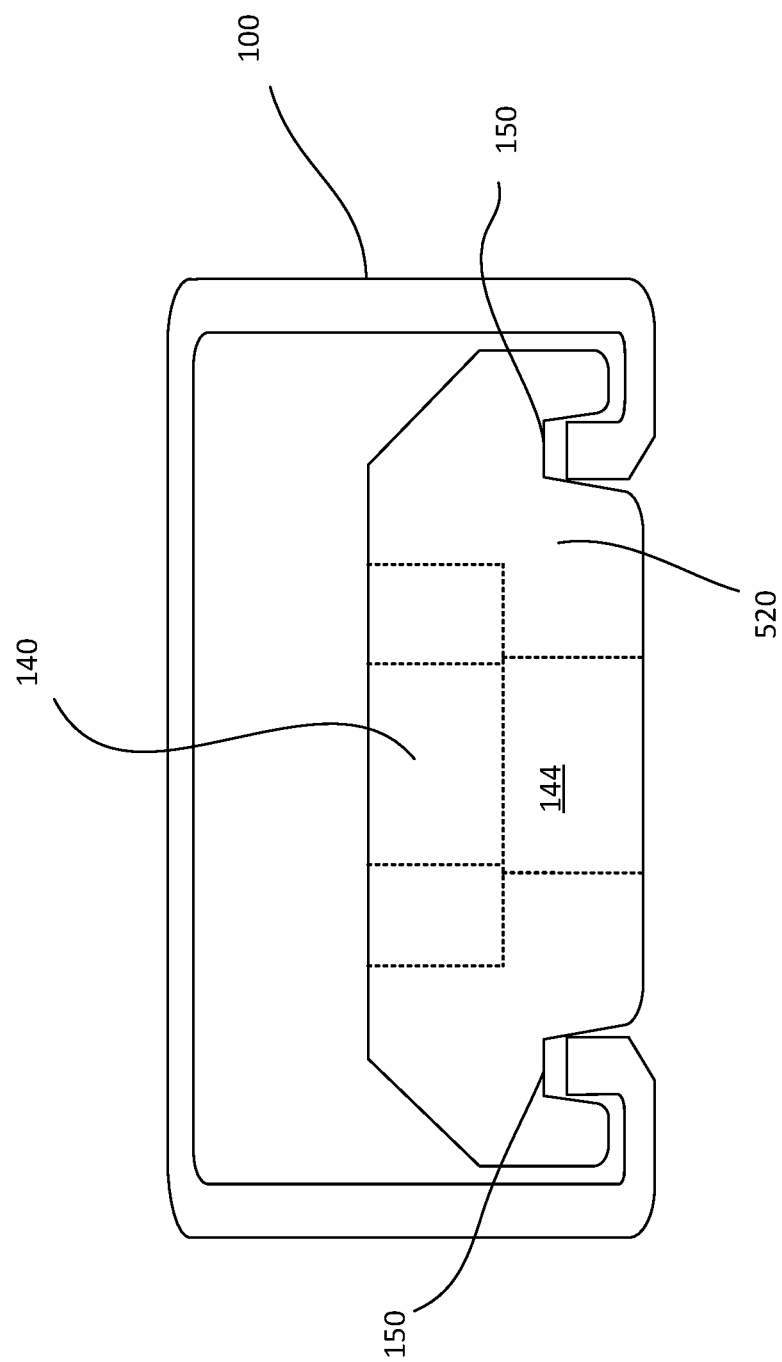
FIG. 13 illustrates a side view of another embodiment of a fastener block.

Additional variations exist for the fastener blocks. FIG. 13 illustrate a further embodiment of a fastener block 520. As illustrated, the fastener block is configured for use in a shallow strut channel 100. In such an arrangement, there may not be enough space to utilize a dual sided fastener block that may receive two or more differently sized fasteners. In such an arrangement, a single sided fastener block may be utilized having a fastener recess 140 on a top surface 122 that surround an aperture 144 passing through the fastener block. Two channels 150 may be formed on the lower surface of the fastener block for engaging the lips of the strut channel. Though not permitting use of multiple sized fasteners, this embodiment still allows use of standard nuts and bolts.

Figure 14A:
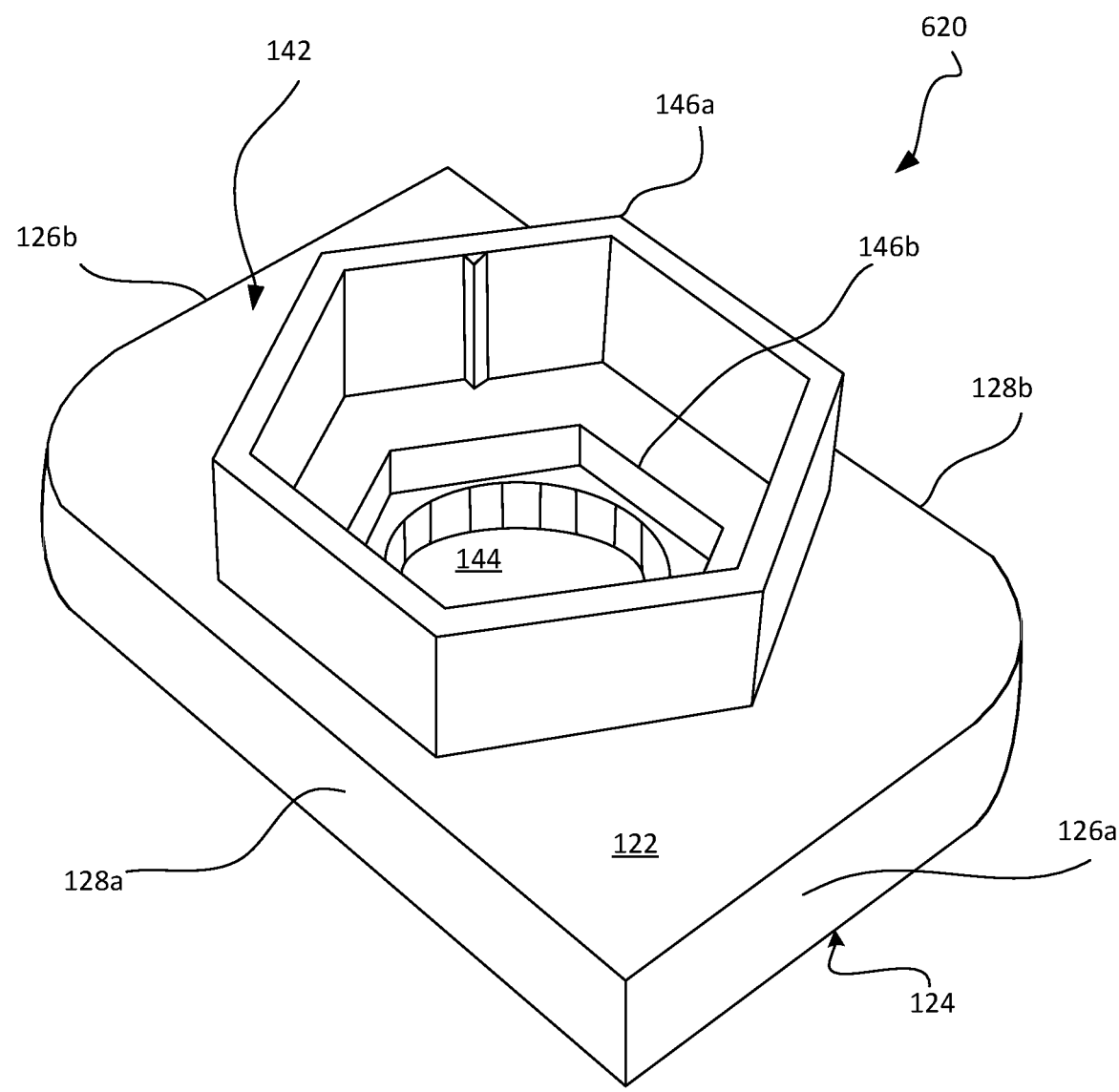
FIGS. 14A-C illustrates a perspective view of three additional embodiments of a fastener block.

FIG. 14A illustrate another embodiment of a fastener block 620. As illustrated, the fastener block 620 includes a body 142 having an upper surface 122, a lower surface, two side surfaces 126a, 126b, a front side surface 128a and a rear side surface 128b. The fastener block 620 includes a first fastener receptacle 146a formed on its upper surface 122 and disposed about an aperture 144 that passes through the fastener block between the upper and lower surfaces. More specifically, the first fastener receptacle 146a is a wall or projection that extends/projects above the upper surface 122 of the block 620. As illustrated, the first fastener receptacle 146a is a continuous wall having a closed geometric shape (e.g., hexagonal shape) with an open or recessed interior. The recessed interior of the first fastener receptacle 146a is configured to receive a head of a bolt or a nut as variously described above. Optionally, the fastener block 60 may include a second fastener receptacle 146b formed about the aperture 144. As illustrated, the second fastener receptacle 146b is a smaller receptacle formed as a recess in the bottom of the first fastener receptacle 146a. That is, the first and second fastener receptacles 146a, 146b are nested (e.g., generally concentric). The nesting of the receptacles allows the fastener block 620 to engage differently sized fasteners (e.g., nuts and bolts) relative to a single aperture 144. Though illustrated as having two nested receptacles, it will be appreciated that the block 620 could have three or even four nested receptacle with each lower receptacle being smaller than the upper receptacle(s). Additionally, one or more receptacles could be tapered to engage with different sized fasteners. That is, an upper portion of the receptacle could engage with larger nuts/bolts while a lower portion of the receptacle could engage with smaller nuts/bolts. Further, it will be appreciated that the nested receptacles may each be recessed below the upper surface of the fastener block. For instance, the recesses described above in relation to FIGS. 3A-13 could have an additional receptacle(s) formed in the bottom of some or all of the described recesses. Of note, the embodiment illustrated in FIG. 14A does not include the recessed channels described above. However, it will be appreciated that the fastener block 620 could include such recessed channels.

Figure 14B:
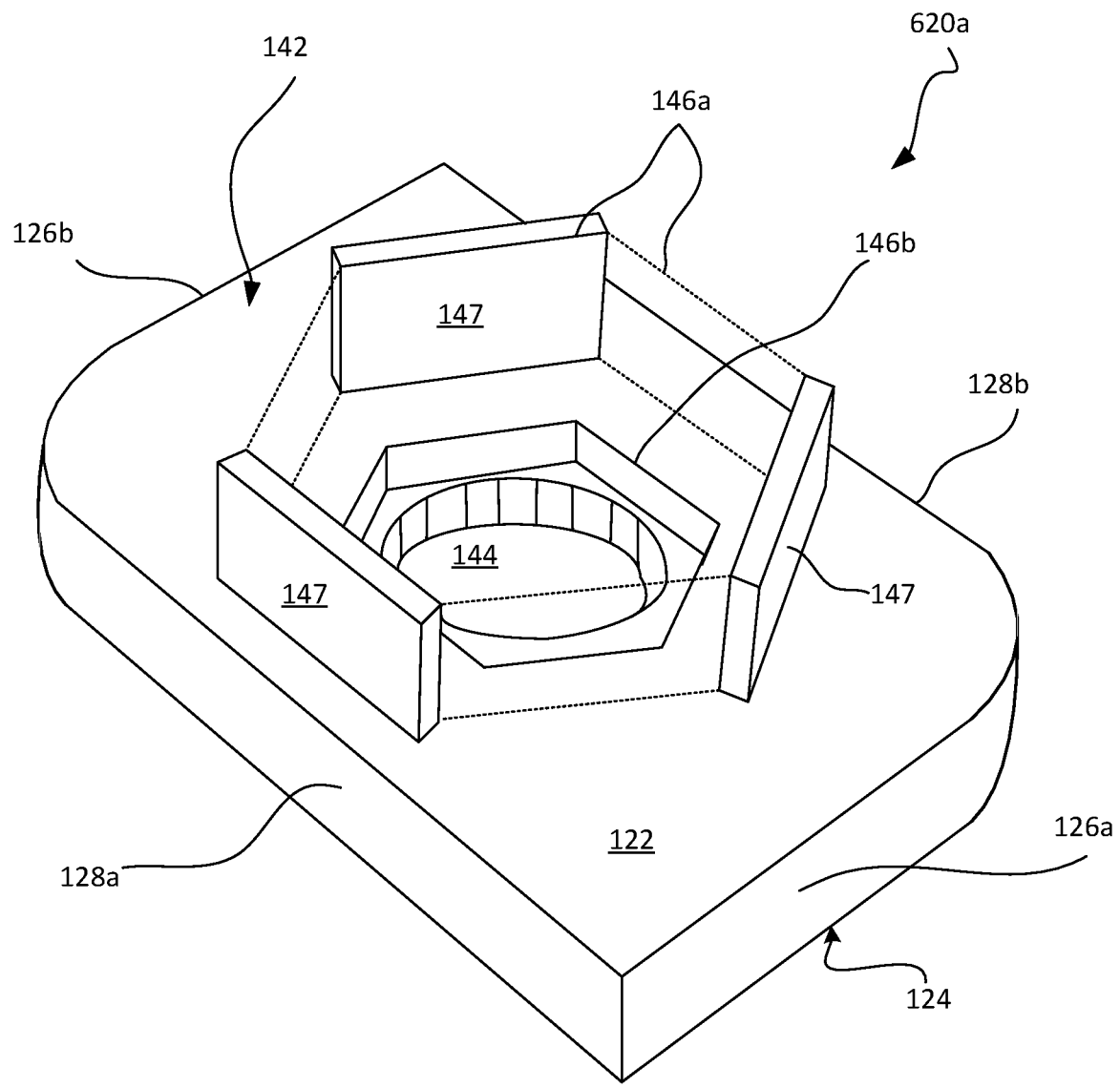

FIG. 14B illustrates a variation of the fastener block of FIG. 14A. As illustrated, the fastener block 620a of FIG. 14B shares numerous common features with the embodiment of FIG. 14A and common reference numbers refer to common elements. In the illustrated embodiment, the first fastener receptacle 146a is defined by separate walls or projections 147 that extend above the top surface 122 of the fastener block. This is, rather than having a continuous projection with an open interior that is sized to receive a fastener, the separate projections 147 collectively define an interior area (e.g., receptacle 146a) as partially illustrated by phantom lines, that is sized to receive a fastener (e.g., nut or bolt). When a fastener is positioned between the projections 147, the projections 147a prevent the fastener from turning.

Figure 14C:
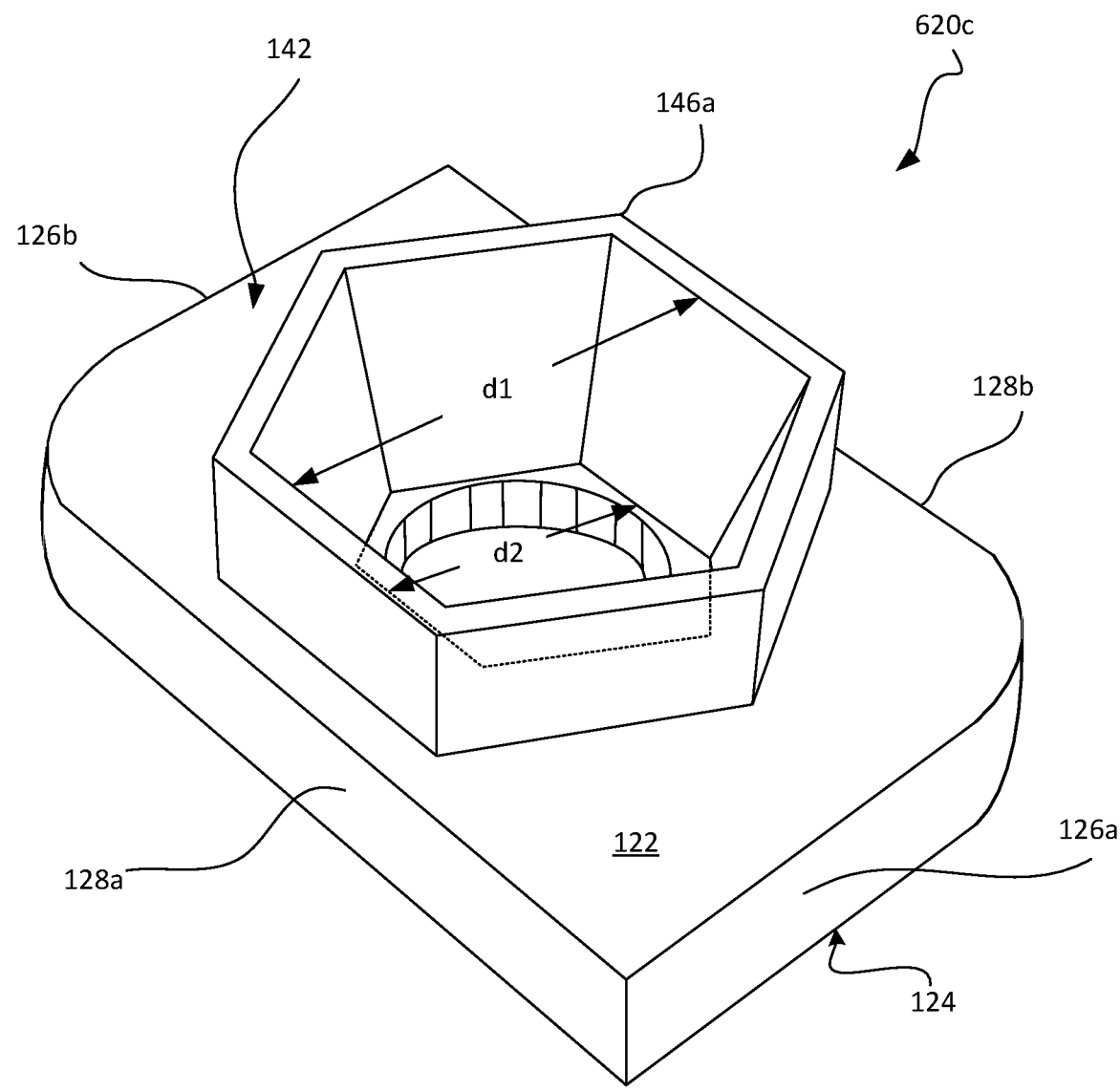

FIG. 14C illustrates a variation of the fastener block of FIG. 14A. As illustrated, the fastener block 620c of FIG. 14C shares numerous common features with the embodiment of FIG. 14A and common reference numbers refer to common elements. In the illustrated embodiment, the fastener block has a single receptacle 146a that is configured to engage differently sized fasteners (e.g., nut and bolts). In this embodiment, the interior walls of the receptacle 146a taper. In this regard, a cross-dimension d1 at the upper edge of the receptacle 146a is larger than a corresponding cross-dimension d2 at the lower edge of the receptacle 146b. This allows inserting different sized nuts or bolts into the receptacle. A nut or bolt extends into the receptacle 146a to the point that the tapering sidewalls have a smaller cross-dimension than the cross-dimension of the nut or bolt.

Figure 15:
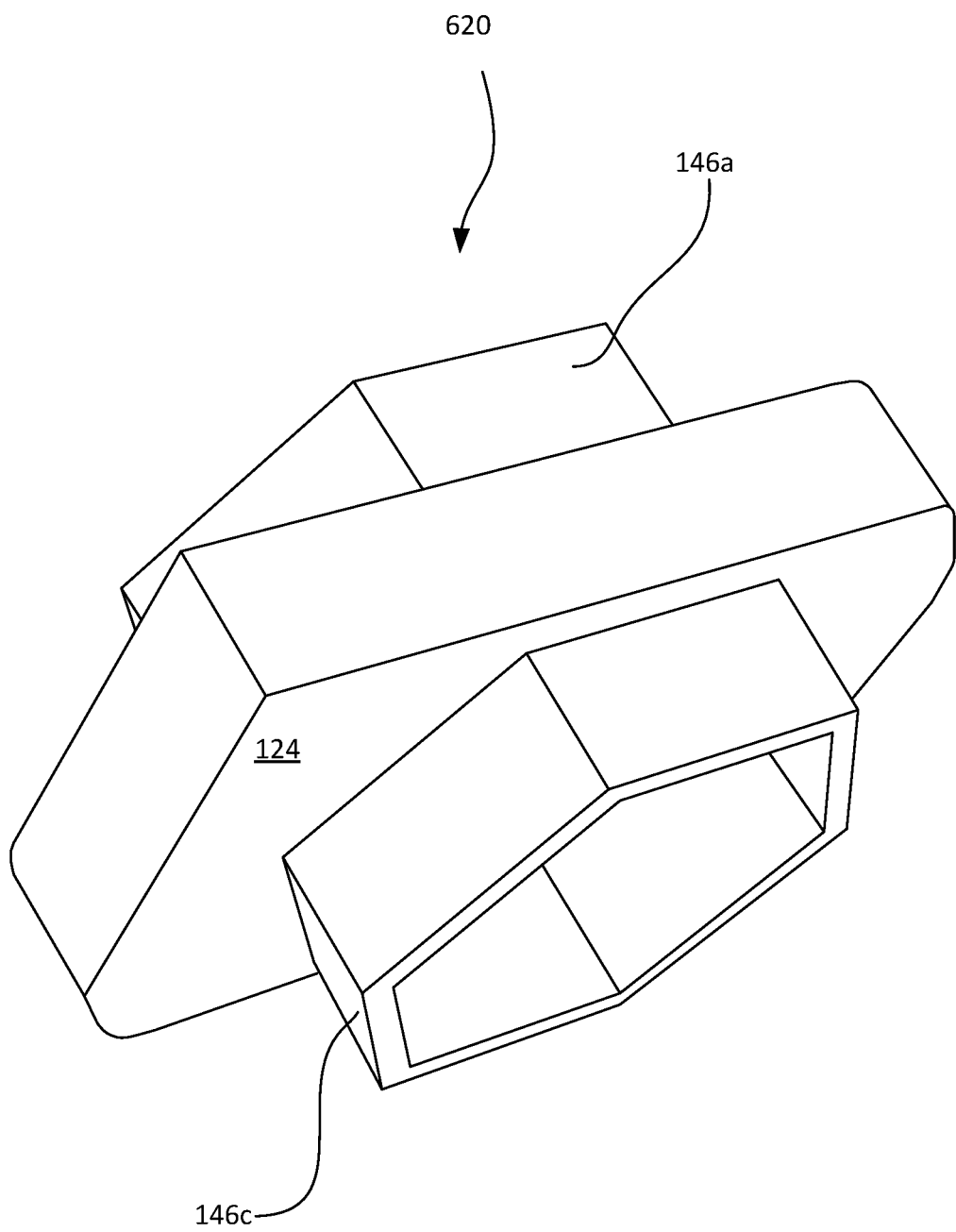
FIG. 15 illustrates a perspective view of another embodiment of a fastener block.

FIG. 15 illustrates a further embodiment of the fastener block 620. In this embodiment, the block may have an upper receptacle 146a formed about an aperture (not shown) on the upper surface of the block and a lower receptacle 146c formed about the aperture on the lower surface 124 of the block. As with the embodiment of FIG. 14, either or both of the receptacle 146a, 146c may include one or more additional nested receptacle formed therein.

Figure 16A:
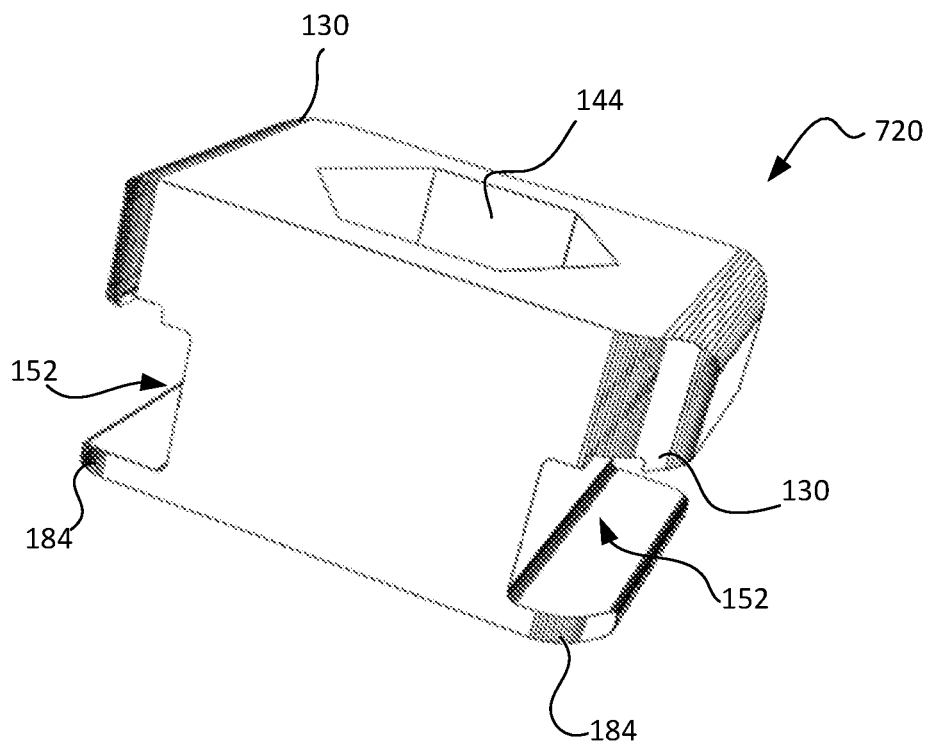
FIG. 16A illustrates a perspective view of another embodiment of a fastener block.
Figure 16B:
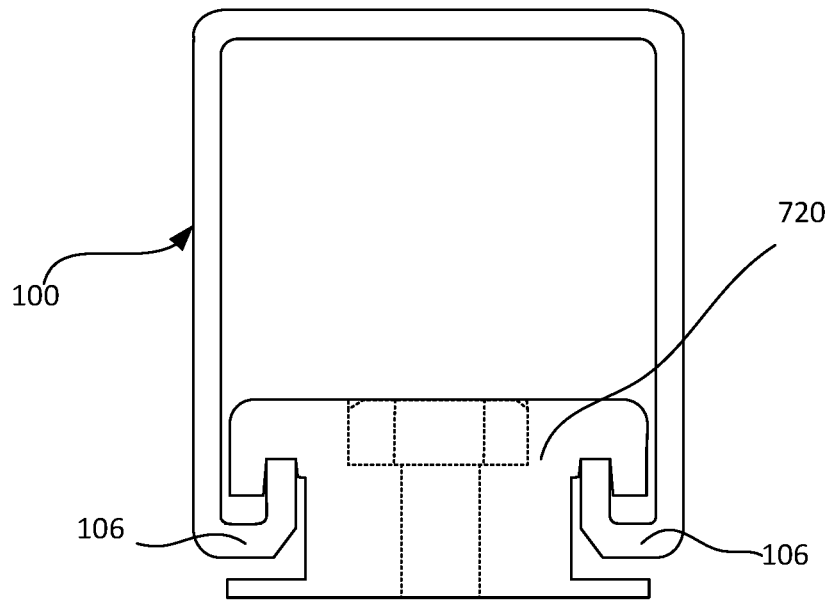
FIG. 16B illustrates the fastener block of FIG. 16A disposed in a strut channel.

FIGS. 16A and 16B illustrate a further embodiment of a fastener block 720. As illustrated, the block 720 includes at least a first fastener receptacle 144 disposed about an aperture 144 that extends through the block 720 between its upper and lower surfaces. In this embodiment, the block 720 includes side channels 152 formed into opposing side surfaces. These channels 152 are sized to receive the flanges 106 of a channel strut 100 when the block 720 is disposed within the strut as best illustrated in FIG. 16B. The block 720 includes two rounded corners 130 (diagonally opposing corners) that allow the block to rotate within the channel to position the strut flanges 106 within the channels 152. This is substantially similar to the insertion process described in FIG. 8. However, once rotated into position, rather than being disposed entirely within the strut, the block 720 traps the flanges 106 between upper and lower surfaces of the channels 152. In this regard, the lower surfaces of the channels 152 or flanges 182 are disposed on an outside surface of the strut 100 when the fastener block 720 is positioned.

Figure 17:
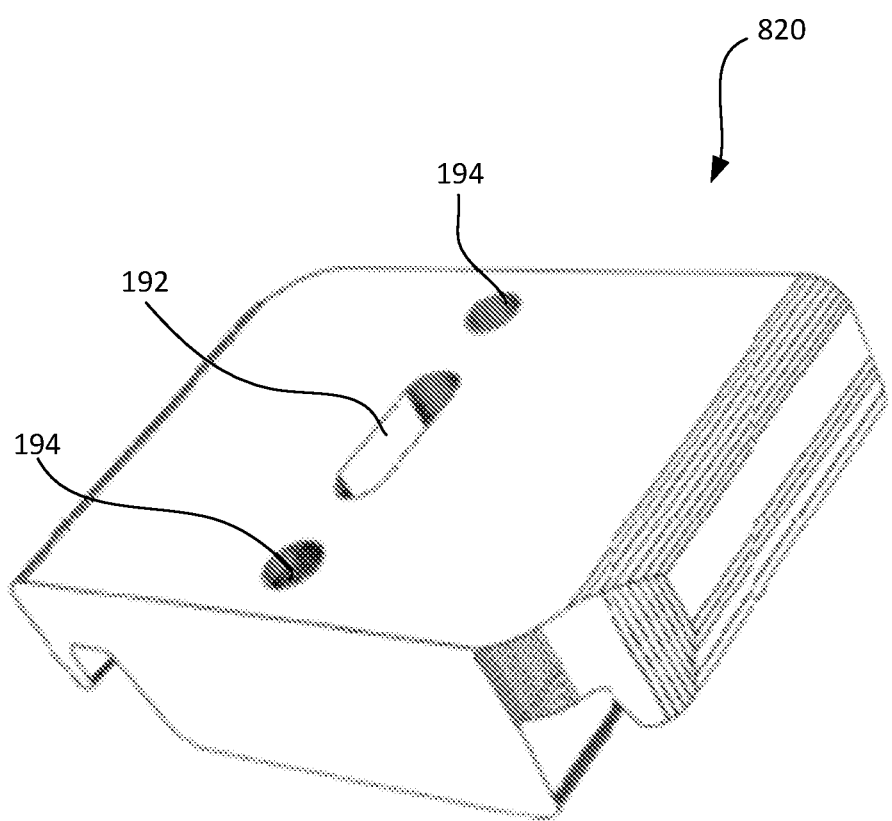
FIG. 17 illustrates a perspective view of another embodiment of a fastener block.

FIG. 17 illustrates another embodiment of a fastener block 820. The illustrated fastener block 820 shares many attributes with the fastener blocks discussed above. In contrast to the previously described fastener blocks, the illustrate fastener block 820 lacks a fastener receptacle that receives and prevents rotation of a fastener. Rather, the fastener block 820 is configured to be engaged by a screw (e.g., pointed, self-tapping etc.). The screw may be driven into the body of the block once the block is positioned with a strut. To facilitate engagement with such a screw, the block 820 may be made of a soft material (e.g., polymer). Further, the block 820 may include a slot 192 and/or aperture(s) 194 that extend partially or entirely through the block. These opening provide location for a screw to engage the block 820.

Figure 18A:
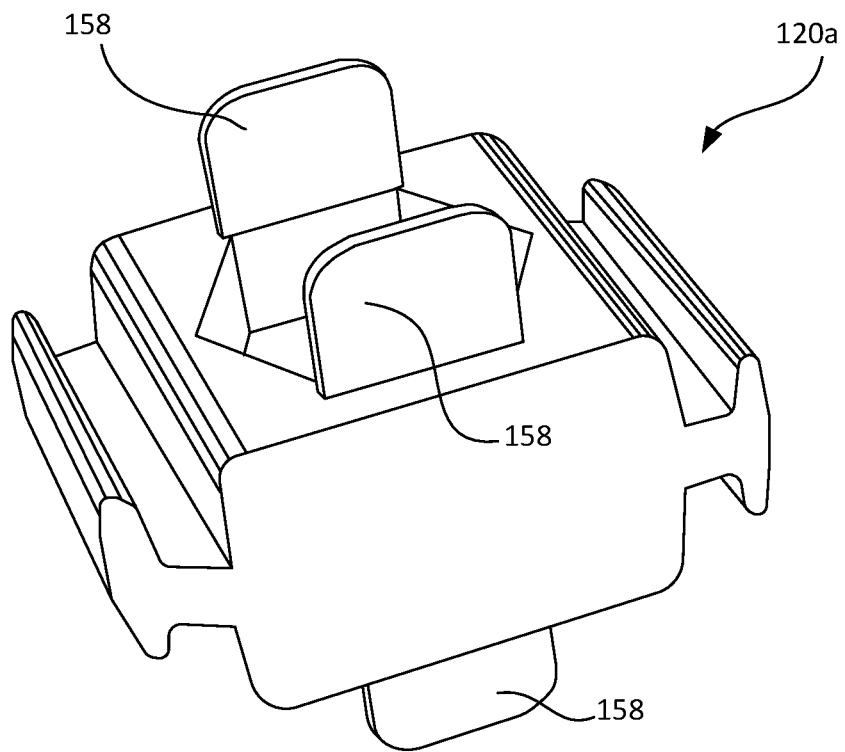
FIGS. 18A and 18B illustrate gripping tabs that may be incorporated into any of the fastener blocks.
Figure 18B:
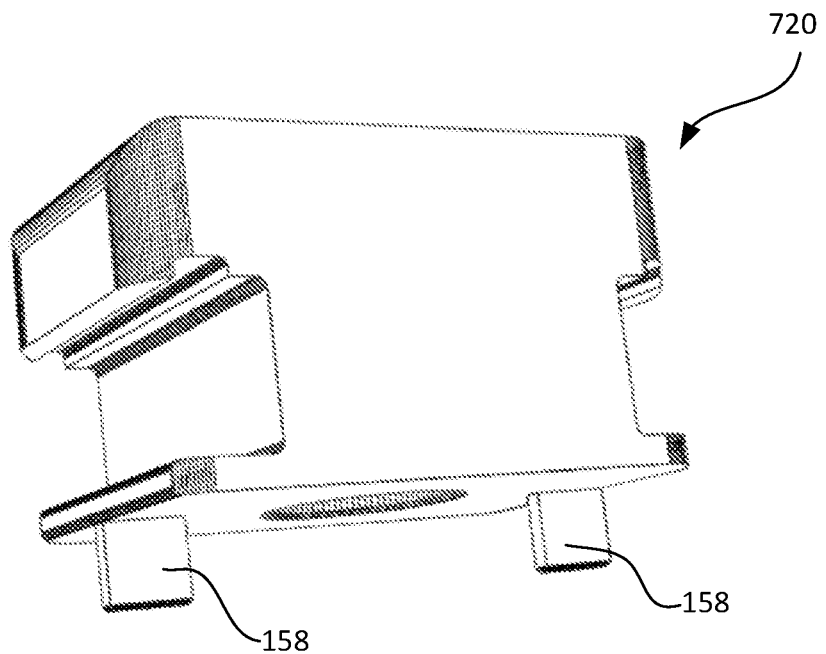

FIGS. 18A and 18B illustrate fastener blocks 120a and 720, which have been previously described, as modified to include positioning tabs 158. As illustrated, various tabs 158 may be formed on the upper or lower surfaces of the fastener blocks. The 158 allow a user to more easily position the fastener block within a strut channel. The tabs 158 are particularly useful for rotating the fastener blocks when disposed within a strut channel. Such tabs may be incorporated onto any embodiment of the fastener blocks. Further, it will be appreciated that the tabs are not limited to the illustrated design. Any protrusion that allows a user to grasp the fastener may be utilized.

Figure 19A:
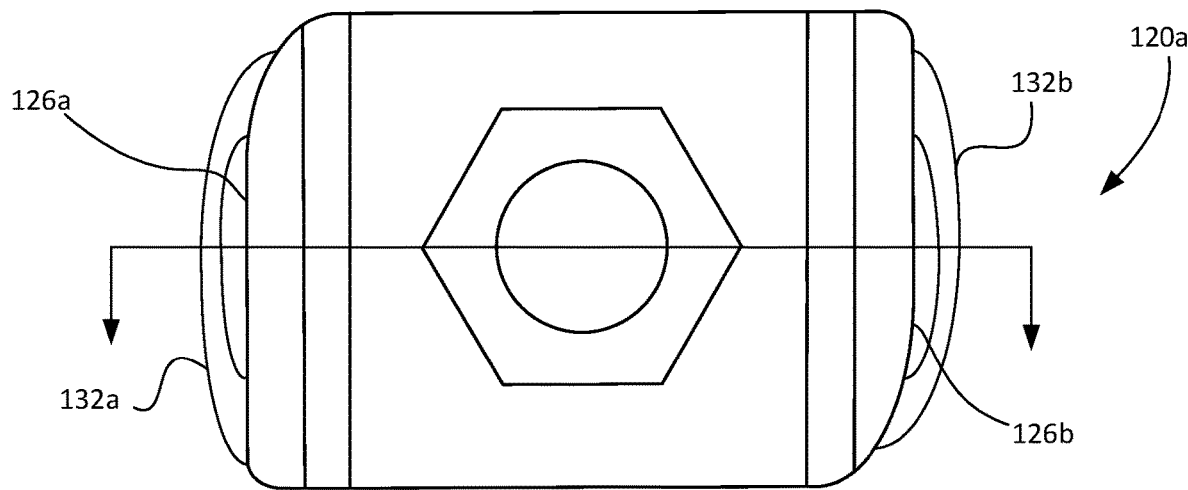
FIGS. 19A-19C illustrates deflectable protrusions or spring tabs that may be incorporated into any of the fastener blocks.
Figure 19B:
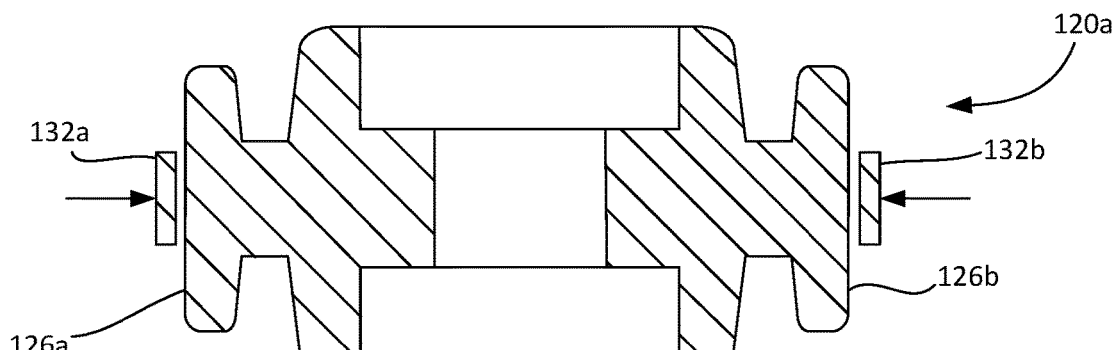
Figure 19C:
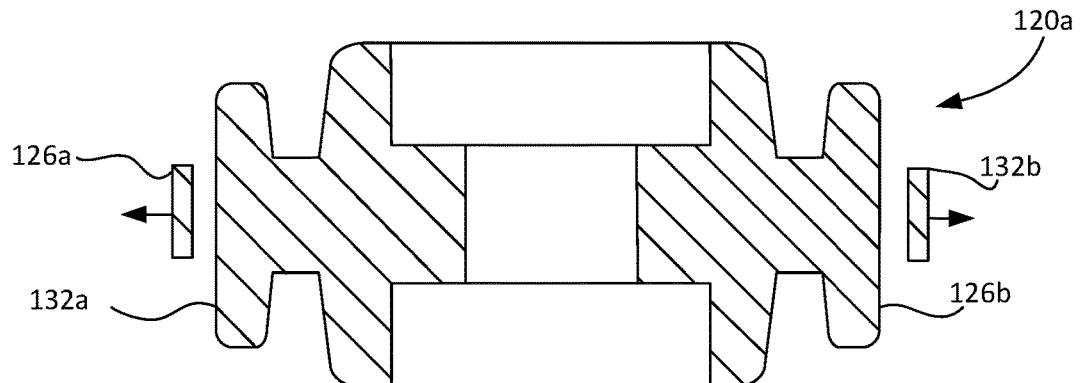

FIGS. 19A-C illustrates a fastener block 120a substantially similar to that described in relation to FIGS. 5a-5c with the addition of deflectable protrusions 132a, 132b (hereafter 132 unless specifically references) formed on the opposing side surfaces 126a, 126b, respectively. The deflectable protrusions 132 (e.g., spring tabs) are configured to compress inward during installation within a channel strut as illustrated in the cross-sectional view of FIG. 19B. The and provide an outward retaining force once positioned to hold the fastener block at a desired position within a channel strut. As illustrated, the illustrated deflectable protrusions 132 are formed similar to a leaf spring having both ends attached to a side of the fastener block 120a. However, it will be appreciated that other spring type protrusions (e.g., cantilevered) may be utilized as well. What is important is that the protrusions elastically/resiliently deflect to allow installation and subsequently apply a restraining force for the block.

Figure 20:
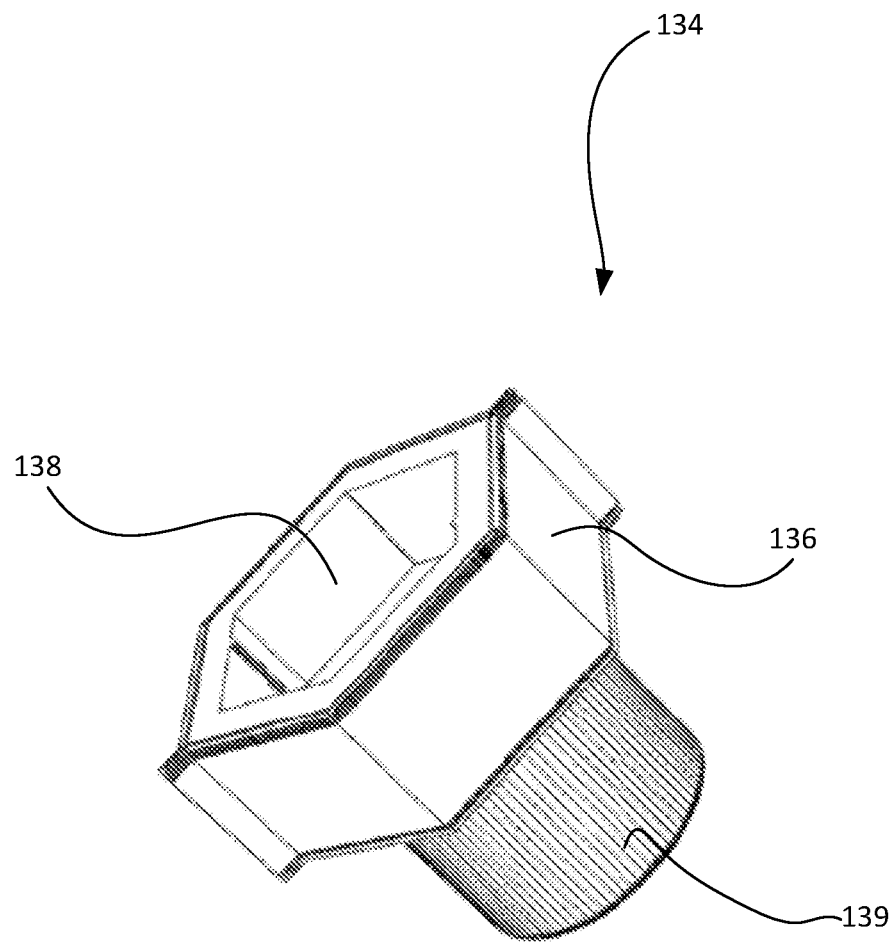
FIG. 20 illustrates and insert that may be utilized with the fastener blocks or existing strut hardware.

FIG. 20 illustrates an insert 134 that could be utilized with the fastener blocks described herein or potentially with existing hardware to convert the size of a fastener recess to a smaller size. As illustrated, the insert has an upper end having an outside surface 136 configured for receipt in a fastener recess (e.g., hexagonal). The upper end also has a fastener recess or inside surface 138 that is configured to receive a nut or bolt head. A lower end of the insert 134 may include a hollow sleeve that may be positioned, for example, through the apertures of the fastener blocks described above.

Figure 21A:
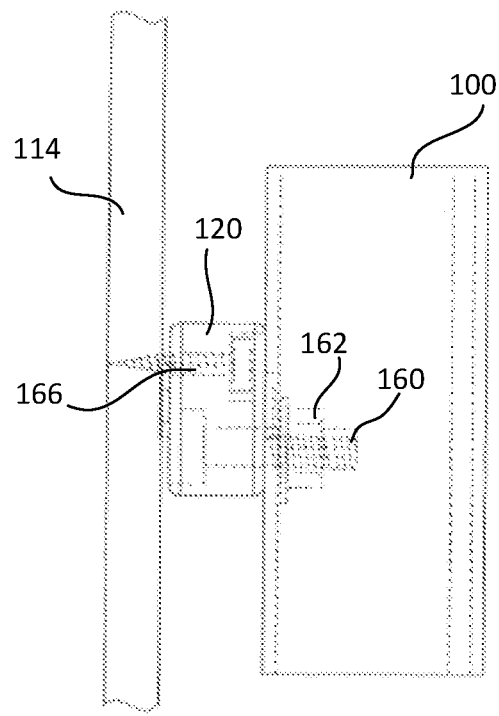
FIGS. 21A and 21B illustrate use of a fastener block to attach a channel strut to a structure such as a wall or another strut.
Figure 21B:
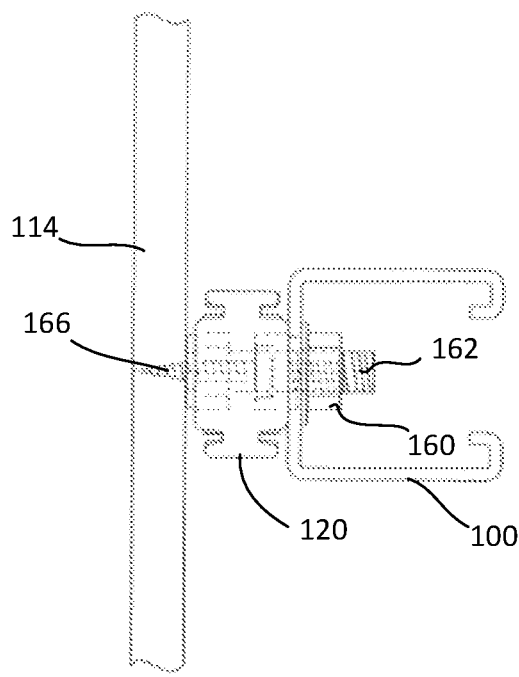

FIGS. 21A and 21B illustrate use of a fastener block 120 to secure a strut channel 100 to a wall surface 114. As illustrated, a bolt 162 may be disposed through a first surface of the fastener block 120 such that a head of the bolt is disposed within a fastener recess. A second attachment element such as screw 166 may pass through the fastener block 120 form an opposite surface to engage the wall 114. At this time. The bolt 162 may pass through an aperture in the strut channel 100 and a nut may engage the bolt 162 to secure the strut channel 100 to the wall 114.

The presented fasteners provide a number of benefits over prior strut fasteners. In various embodiments, the fasteners may be made of non-reactive materials (e.g., polymeric materials) that isolate potentially dissimilar materials (e.g., strut channel and bolt) to prevent, for example, galling, corrosion, and other negative effects that arise if the components are incompatible. The disclosed fasteners may also provide electrical isolation. The fasteners also allow use of standard nuts and bolts of varying sizes thereby eliminating the use of a wide variety of differently sized diameter and thread configurations of prior specialized fasteners. Further, standard or metric nuts and bolts may be utilized interchangeably with a single fastener. Prior fasteners attempt to use springs, wings, threading of components, etc., to hold the fastener in place during application. Such methods do not fully solve the issue of the product moving within the channel during installation and or attachment. That is, current methods do not adequately hold the fastener prior, and during installation, in positioning incrementally, and tightening of the fastener. The use of the malleable protrusions or spring-type protrusions on one or more outer surfaces of the presented fasteners provide a secure fit between the fastener and the strut channel during the application process.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. Further any feature illustrated in any one embodiment may be incorporated into any other embodiment. That is, different aspects of the different embodiments may be utilized in different combinations. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A fastener for use in attaching objects to a strut channel having first and second spaced sidewalls and having a first width between opposing inside surfaces of the spaced sidewalls, comprising:
   a body having an upper surface and a lower surface and four sidewall surfaces extending between the upper surface and lower surface;
   a first aperture passing through the body between the upper surface and the lower surface, the first aperture having a centerline axis;
   a first fastener receptacle formed on the upper surface of the body and around the first aperture, the first fastener receptacle has a geometric shape configured to engage a nut or a bolt head and prevent the nut or bolt head from turning;
   a second fastener receptacle formed on the lower surface of the body around the first aperture, wherein the second fastener receptacle has a geometric shape configured to engage a nut or bolt head and prevent the nut or bolt head from turning, wherein the first fastener receptacle and second fastener receptacle have different cross-dimensions; and
   wherein a maximum cross-dimension of the body between a first corner of the body between two adjacent sidewalls surfaces and an opposing second corner between two other adjacent sidewall surfaces is less than the first width of the strut channel, wherein the body may rotate within the strut channel between the first and second spaced sidewalls about an axis parallel to the centerline axis of the first aperture.

2. The fastener of claim 1, wherein the first fastener receptacle comprises at least one projection that extends above the upper surface of the body.

3. The fastener of claim 2, wherein the at least one projection defines a geometric shape having a recessed interior configured to receive the nut or the bolt head.

4. The fastener of claim 1, wherein the second fastener receptacle comprises one of:
   at least one projection that extends above the lower surface of the body; and
   a recess formed in the lower surface of the body.

5. The fastener of claim 1, wherein the first fastener receptacle comprises a hexagonal opening disposed around the aperture and configured to receive the nut or bolt head.

6. The fastener of claim 1, further comprising:
   a first pair of recessed channels formed in the lower surface of the body, the first pair of recessed channels being parallel and disposed on opposing sides of the first aperture.

7. The fastener of claim 1, further comprising:
   a second aperture passing through the body between the upper surface and the lower surface;
   a second fastener receptacle formed on the upper surface of the body and around the second aperture, the second fastener receptacle configured to engage a nut or a bolt head and prevent the nut or bolt head from turning.

8. The fastener of claim 7, wherein the first fastener recess and the second fastener recess have different cross-dimensions.

9. The fastener of claim 1, further comprising:
   first and second opposing side surfaces extending between the upper and lower surfaces, wherein a distance between first and second opposing side surfaces defines a width of the fastener; and
   at least first and second protrusions disposed on and extending above the first and second side surfaces, respectively, wherein a distance between outside surfaces of the protrusions is greater than the width of the fastener.

10. The fastener of claim 9, wherein the first and second protrusions comprise deflectable protrusions, wherein the deflectable protrusions are integrally formed with the body of the fastener.

11. The fastener of claim 1, wherein the first receptacle tapers from a wider cross-dimension at an upper edge to a narrower cross-dimension at a lower edge.

12. The fastener of claim 1, wherein the body is formed of a polymeric material.

13. The fastener of claim 1, wherein the first corner comprises a first rounded surface extending between the two adjacent sidewalls surfaces the opposing second corner comprises a second rounded surface extending between the two other adjacent sidewall surfaces.

14. The fastener of claim 13, wherein a distance between a third corner of the body and an opposing fourth corner of the body is greater than the first width of the strut channel.

15. The fastener of claim 1, wherein the body may rotate from a first orientation wherein first and second opposing sidewalls of the body are transverse to the first and second sidewalls of the strut channel to a second orientation where the first and second opposing sidewall of the body are substantially parallel to the to the first and second sidewalls of the strut channel.

16. A fastener for use in attaching objects to a strut channel having first and second spaced sidewalls and having a first width between opposing inside surfaces of the spaced sidewalls, comprising:
   a body having an upper surface and a lower surface and four sidewall surfaces extending between the upper surface and lower surface;
   a first aperture passing through the body between the upper surface and the lower surface;
   a first fastener receptacle formed on the upper surface of the body and around the first aperture, the first fastener receptacle has a geometric shape configured to engage a nut or a bolt head and prevent the nut or bolt head from turning;
   a second aperture passing through the body between the upper surface and the lower surface;
   a second fastener receptacle formed on the upper surface of the body and around the second aperture, the second fastener receptacle configured to engage a nut or a bolt head and prevent the nut or bolt head from turning; and
   wherein a maximum cross-dimension of the body between a first corner of the body between two adjacent sidewalls surfaces and an opposing second corner between two other adjacent sidewall surfaces is less than the first width of the strut channel, wherein the body may rotate within the strut channel between the first and second spaced sidewalls about an axis parallel to the centerline axis of the first aperture.

17. The fastener of claim 16, wherein the first fastener recess and the second fastener recess have different cross-dimensions.

* * * * *